(12) United States Patent
Campo Trapero et al.

(10) Patent No.: US 11,463,364 B2
(45) Date of Patent: Oct. 4, 2022

(54) METHODS, NODES AND OPERATOR NETWORK FOR ENABLING FILTERING OF TRAFFIC FROM AN APPLICATION

(71) Applicant: Telefonaktiebolaget LM Ericsson (publ), Stockholm (SE)

(72) Inventors: Javier Campo Trapero, Madrid (ES); Rodrigo Alvarez Dominguez, Madrid (ES); Franco Foresti, Madrid (ES); Miguel Angel Muñoz De La Torre Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 18 days.

(21) Appl. No.: 17/261,278

(22) PCT Filed: Sep. 7, 2018

(86) PCT No.: PCT/EP2018/074081
§ 371 (c)(1),
(2) Date: Jan. 19, 2021

(87) PCT Pub. No.: WO2020/020473
PCT Pub. Date: Jan. 30, 2020

(65) Prior Publication Data
US 2021/0243126 A1     Aug. 5, 2021

(30) Foreign Application Priority Data

Jul. 24, 2018  (EP) ..................... 18382553

(51) Int. Cl.
*H04L 47/20* (2022.01)
*H04L 47/2408* (2022.01)
(Continued)

(52) U.S. Cl.
CPC .......... *H04L 47/20* (2013.01); *H04L 47/2408* (2013.01); *H04L 63/0236* (2013.01); *H04L 67/303* (2013.01); *H04L 67/55* (2022.05)

(58) Field of Classification Search
CPC . H04L 47/20; H04L 47/2408; H04L 63/0236; H04L 67/26; H04L 67/303;
(Continued)

(56) References Cited

U.S. PATENT DOCUMENTS

| 2018/0069798 | A1* | 3/2018 | Bacik | ................... H04W 24/08 |
| 2018/0192471 | A1* | 7/2018 | Li | ........................ H04W 12/06 |
| 2021/0289390 | A1* | 9/2021 | Zhou | ...................... H04L 47/20 |

FOREIGN PATENT DOCUMENTS

| WO | 2004029854 A2 | 4/2004 |
| WO | 2004100466 A1 | 11/2004 |

OTHER PUBLICATIONS

International Search Report and Written Opinion dated Apr. 18, 2019 for International Application No. PCT/EP2018/074081 filed on Sep. 7, 2018, consisting of 13-pages.
3GPP TSG CT Meeting #79 CP-180053; Title: Presentation sheet for 3GPP TS 29.122 V1.0.0 on T8 reference point for Northbound APIs for Information; Source: 3GPP TSG CT WG3: Document for: Information; Date and Location: Mar. 19-20, 2018, Chennai, India, consisting of 1-page.
(Continued)

*Primary Examiner* — Jung H Park
(74) *Attorney, Agent, or Firm* — Christopher & Weisberg, P.A.

(57) ABSTRACT

Methods, a policy node, an application node, a storage node and an operator network for enabling filtering of traffic from an application hosted by the application node are disclosed. The policy node receives, from the application node, application content information relating to the filtering of the traffic and an identifier of the application to which the application content information applies, wherein the application content information comprises an indication relating to application content category of the traffic, and wherein the application content information comprises one or more of an adaptability indicator specifying whether the application is
(Continued)

able to adapt the traffic to a given user content category, and a notification indicator specifying whether the application is able to notify, to the policy node, an application content category before providing requested traffic. The policy node further transmits, by the policy node to the storage node, the application content information.

18 Claims, 12 Drawing Sheets

(51) Int. Cl.
*H04L 9/40* (2022.01)
*H04L 67/303* (2022.01)
*H04L 67/55* (2022.01)

(58) Field of Classification Search
CPC .. H04L 63/0227; H04L 67/306; H04W 12/61; H04W 12/088; H04W 12/37
See application file for complete search history.

(56) References Cited

OTHER PUBLICATIONS

3GPP TS 23.501 V0.5.0; 3rd Generation Partnership Project Project; Technical Specification Group Services and System Aspects; System Architecture for the 5G System; Stage 2 (Release 15); May 2017, consisting of 145-pages.

3GPP TS 29.122 V1.0.0; 3rd Generation Partnership Project Project; Technical Specification Core Network and Terminals; T8 reference point for Northbound APIs (Release 15); Mar. 2018, consisting of 152-pages.

3GPP TS 23.682 V15.9.0; 3rd Generation Partnership Project Project; Technical Specification Group Services and System Aspects; Architecture enhancements to facilitate communications with packet data networks and applications (Release 15); Jun. 2019, consisting of 125-pages.

Indian Office Action dated Jan. 18, 2022 for Patent Application No. 202117007030, consisting of 8-pages.

* cited by examiner

METHODS, NODES AND OPERATOR NETWORK FOR ENABLING FILTERING OF TRAFFIC FROM AN APPLICATION

CROSS-REFERENCE TO RELATED APPLICATIONS

This application is a Submission Under 35 U.S.C. § 371 for U.S. National Stage Patent Application of International Application No.: PCT/EP2018/074081, filed Sep. 7, 2018 entitled "METHODS, NODES AND OPERATOR NETWORK FOR ENABLING FILTERING OF TRAFFIC FROM AN APPLICATION," which claims priority to European Patent Application No.: 18382553.8, filed Jul. 24, 2018, the entireties of both of which are incorporated herein by reference.

TECHNICAL FIELD

Embodiments herein relate to wireless communication systems, such as radio communication systems, cellular systems, mobile telephone communication systems or the like. In particular, a policy node, an application node, a storage node and an operator network as well as corresponding methods therein for enabling filtering of traffic from an application are disclosed. Corresponding computer programs and computer program carriers are also disclosed.

BACKGROUND

Management and monitoring of traffic occurs in many different computer systems or architectures, such as those that are specified by the Third Generation Partnership Project (3GPP).

A known reference architecture for fifth generation (5G) networks is defined by 3GPP Technical Specifications (TS) 23.501 V0.5.0 (2017-05), section 4.2.3. A few so called network functions of the known reference architecture are described in the following. Some interfaces between the network functions are also described.

Typically, a Packet Flow Description Function (PFDF) is included inside a Network Exposure Function (NEF) to reduce the number of network functions in 5G. The PFDF handles Packet Flow Descriptions (PFDs) associated with an application identifier and transfers them to a Session Management Function (SMF) via Next Generation (NG) Gw interface. The SMF sends the PFDs towards a User Plane Function (UPF) by means of an N4 PFD Management procedure to enable the UPF to perform accurate application detection when the PFDs are managed by a 3rd party service provider, aka Application Service Provider (ASP).

TS 29.122, Release (Rel.) 15 defines a so called T8 interface between a Service Capability Server/Application Server (SCS/AS) and the NEF in the case of the 5G reference architecture or a Service Capability Exposure Function (SCEF) in case of a 4G network reference architecture. The T8 interface specifies RESTful Application Programming Interfaces (APIs) that allow the SCS/AS to access services and capabilities provided by network entities and that allow the SCEF to securely expose these interfaces. One of those APIs is a monitoring event API, as described in subclause 4.4.6.1 in TS 23.682, where SCS/AS can subscribe to some monitoring events like UE loss of connectivity, UE location reporting, UE roaming status, communication failure, change of International Mobile Equipment Identification (IMEI)—International Mobile Subscriber Identification (IMSI) association. Other APIs like NetworkParameterConfiguration API allows the SCS/AS to send the suggested network parameters to influence certain aspects of UE/network behavior.

A Policy and Charging Rules Function (PCF) is a functional element that performs policy control decision and flow-based charging control. The PCF provides network control regarding the service data flow e.g. between a client and an application hosted by the SCS/AS.

A Session Management Function (SMF) manages Non Access Stratum (NAS) handling for Session Management (SM), User Equipment (UE) Internet Protocol (IP) address allocation & management, Sending Quality of Service (QoS)/policy NG2 information to the AN via AMF, Idle/Active aware, UE IP address allocation & management, Policy & Offline/Online Charging i/f termination, Policy enforcement control part, Lawful intercept (CP and interface to LI System), UP selection and termination of NG4 interface The UPF, which may include a Policy Control Enforcement Function (PCEF), encompasses service data flow detection, policy enforcement and flow-based charging functionalities. Anchor point for Intra-/Inter-Radio Access Technology (RAT) mobility when applicable, External IP point of interconnect, Packet routing & forwarding, QoS handling for User plane, Packet inspection and Policy Control and Charging (PCC) rule enforcement, Lawful intercept (UP collection), Roaming interface (UP), Traffic counting and reporting TS 23.682 Rel. 15 specifies the architecture enhancements to facilitate communications with packet data networks and applications.

Network Service Providers (NSP), e.g. operators, and Application Service Providers (ASP)/Over-the-Top (OTT) players attempt to meet new demands from customers. For example, parents or other authorities may wish to restrict consumption of content, for example in terms of when and/or which content shall be allowed to be consumed by e.g. their children or their inferiors. In the same way, an employer may wish to restrict content consumption by its employees.

In Rel 15, TS 23.682, the architecture enhancements to facilitate communications with packet data networks and applications is specified.

Solutions for parental control provide the ability to set limits and controls on e.g. children's usage across all wireless services. Existing parental control solutions allow end users to select a predefined content-category list that defines the contents to be monitored and subsequently blocked or allowed. Those categories are usually defined for external sources, such as operators, 3rd parties and the like. Parents may wish to avoid inappropriate content, excessive usage and device usage during a certain period of a day.

The mobile operators also provide solutions for content-filtering based on Internet Content Adaptation Protocol (ICAP). ICAP is defined in Request For Comments (RFC) 3507. ICAP allows different levels of filtering to be defined and restricts access to inappropriate websites depending on a user profile. Some mobile operators, or NSPs, allow that the end user chooses between different user profiles that have different access restrictions to e.g. websites, web services and the like. A choice of the user profile is usually done by a central web server or by a phone call to a customer service center. In this manner, the end users can specify which categories they wish to filter for themselves or for their children, inferiors or the like.

In view of the foregoing, a problem may thus be how increase flexibility of how traffic can be filtered.

SUMMARY

Current solutions in ICAP, provided by NSP, are content filtering based on either Server Name Identification (TLS Client Hello) or certificate (TLS Server hello), or URLs and they are not able to provide the required granularity in terms of content category. The presence of encrypted traffic generally increases, and not only for TCP but also for User Datagram Protocol (UDP). In those cases where traffic is encrypted the existing ICAP based solutions will not work accurately for more granularity of content or for dynamic content categories along time.

NSPs and ASP/OTT players need to interact for allowing end users to select the content that can be displayed for their children. On the one hand, NSPs have knowledge of a subscriber—being a potential end user of course—and services that subscriber would like to monitor to be able to restrict access, i.e. which services parental control shall be activated for. On the other hand, ASPs/OTTs are aware of the content that they are providing, such as streaming or the like, to the end users. Currently, there is no mechanism in 3GPP networks that allows interaction between ASP/OTT and NSP related to parental control and ICAP solutions. The above mentioned T8 interface supports a series of APIs but none related to content filtering and parental control. The T8 interface (between NSP and ASP/OTT) does not support exchange of parameters relating to content filtering according to its existing specification ASP/OTT has provided some apps, i.e. web services, applications or programs for various devices, such as phones, that are intended to be used by children, where these apps only provide content explicitly selected for children. As an example, a children's version of Youtube is provided at https://kids.youtube.com, but at the end, children can access to the original like youtube.com if they so wish.

ICAP solutions do not support updating and modifying Universal Resource Locators (URLs)/Server Name Indicators (SNIs) dynamically. Some OTTs are providing different contents and ads depending of the time of the day.

OTTs are not aware of what end users desired to see or not to see, i.e. the OTTs are not aware of the subscriber's needs and preferences in terms of content restriction, such as parental control. Some OTT offer general domains, in terms of URLs or SNI definition, that provide all kinds of content and the end user inside those domains search for specific content. In those scenarios, ICAP solutions are not valid because they are filtering based on the categorization of the domain.

An object may be to overcome or at least reduce the above mentioned problems and/or shortcomings.

According to an aspect, the object is achieved by a method, performed by a policy node, for enabling filtering of traffic from an application hosted by an application node towards a user equipment. The policy node receives, from the application node, application content information relating to the filtering of the traffic and an identifier of the application to which the application content information applies. The application content information comprises an indication relating to application content category of the traffic, and wherein the application content information comprises one or more of an adaptability indicator specifying whether the application is able to adapt the traffic to a given user content category, and a notification indicator specifying whether the application is able to notify, to the policy node, an application content category before providing requested traffic. Furthermore, the policy node transmits, to a storage node, the application content information.

According to another aspect, the object is achieved by a method, performed by an application node hosting an application, for enabling filtering of traffic from the application towards a user equipment. The application node transmits, towards a policy node, application content information relating to the filtering of the traffic and an identifier of the application to which the application content information applies. The application content information comprises an indication relating to application content category and one or more of an adaptability indicator specifying whether the application is able to adapt the traffic to a given user content category, and a notification indicator specifying whether the application is able to notify, to the policy node, an application content category before providing requested traffic.

According to a further aspect, the object is achieved by a method, performed by a storage node, for enabling filtering of traffic from an application hosted by an application node towards a user equipment. The storage node receives, from a policy node, application content information relating to the filtering of the traffic and an identifier of the application to which the application content information applies. The application content information comprises an indication relating to application content category and at least one of: an adaptability indicator specifying whether the application is able to adapt the traffic to a given user content category, and a notification indicator specifying whether the application is able to notify, to the policy node, an application content category before providing requested traffic. The storage node stores the application content information.

According to a still further aspect, the object is achieved by a policy node configured for enabling filtering of traffic from an application hosted by an application node towards a user equipment. The policy node is configured for receiving, from the application node, application content information relating to the filtering of the traffic and an identifier of the application to which the application content information applies. The application content information comprises an indication relating to application content category of the traffic, and wherein the application content information comprises one or more of an adaptability indicator specifying whether the application is able to adapt the traffic to a given user content category, and a notification indicator specifying whether the application is able to notify, to the policy node, an application content category before providing requested traffic. The policy node is configured for transmitting, to a storage node, the application content information.

According to yet another aspect, the object is achieved by an application node configured for hosting an application and configured for enabling filtering of traffic from the application towards a user equipment. The application node is configured for transmitting, towards a policy node, application content information relating to the filtering of the traffic and an identifier of the application to which the application content information applies. The application content information comprises an indication relating to application content category and one or more of an adaptability indicator specifying whether the application is able to adapt the traffic to a given user content category, and a notification indicator specifying whether the application is able to notify, to the policy node, an application content category before providing requested traffic.

According to a yet further aspect, the object is achieved by a storage node configured for enabling filtering of traffic from an application hosted by an application node towards a user equipment. The storage node is configured for receiving, from a policy node, application content information relating to the filtering of the traffic and an identifier of the application to which the application content information applies. The application content information comprises an indication relating to application content category and at least one of an adaptability indicator specifying whether the application is able to adapt the traffic to a given user content category, and a notification indicator specifying whether the application is able to notify, to the policy node, an application content category before providing requested traffic. The storage node is configured for storing the application content information.

According to further aspects, the object is achieved by a method performed by an operator network and an operator network corresponding to the aspects above.

Moreover, accord to still further aspects, the object is achieved by computer programs and computer program carriers corresponding to the aspects above.

Thanks to that the storage node receives the application content information, the storage node is able to store the application content information. Accordingly, the policy node is able to retrieve the application content information from the storage node either upon request of traffic from the application or during an attempt to establish an application session between the user equipment and the application.

As mentioned, the application content information comprises the indication relating to application content category of the traffic. In this manner, the indication provides information about which content category to be monitored and subsequently e.g. blocked or allowed.

Furthermore, the adaptability indicator allows the policy node to be informed about the fact that the application is able to adapt the content of the requested traffic according to the given user content category. An advantage may be that adapted content may be provided rather than no content at all is provided, e.g. in case that non-adapted content would be blocked according to a specified user content category, as explained in more detail in section "Detailed Description" below.

Moreover, the notification indicator allows the policy node to be information about the fact that the application is able to notify, i.e. transmit, send or the like, to the policy node an application content category before the requested traffic is transmitted towards the user equipment. An advantage is hence that one and the same application may provide content associated with different application content categories as given by the application content category transmitted before the requested traffic is transmitted. In this manner, an end user of the user equipment may gain access to certain portions of content provided by this one and the same application.

Hence, according to the embodiments herein, enhancements to the aforementioned T8 interface are provided in order to support actions for allowing end users to more flexibly control access to content, e.g. provided by web resources, applications and the like. Furthermore, enhancements to an interface, referred to as Nudr in related literature, towards the storage node, e.g. UDR, are provided.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
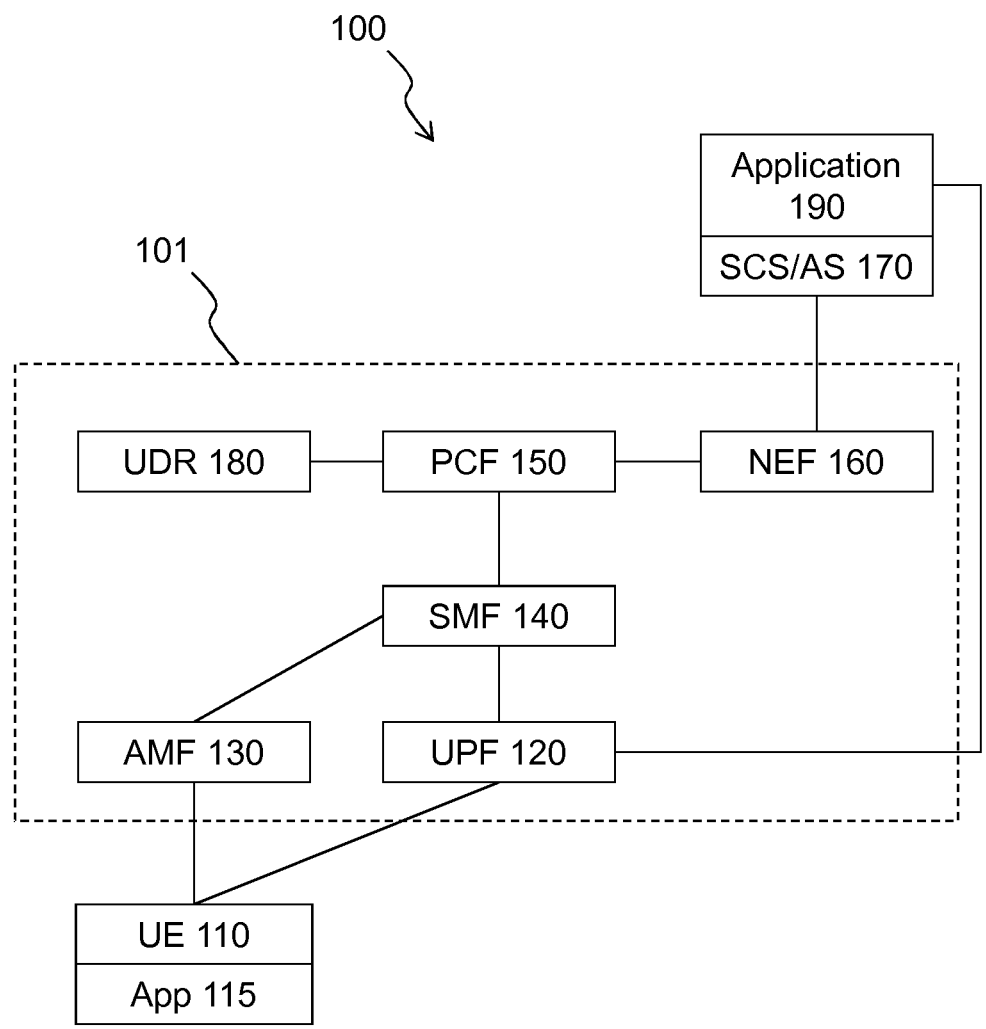
FIG. 1 is a schematic overview of an exemplifying system in which embodiments herein may be implemented.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying system 100 in which embodiments herein may be implemented.

In this example, the system 100 may comprise an operator network 101. The operator network 101 may comprise a Global System for Mobile communications network, a Long Term Evolution (LTE), Universal Mobile Telecommunication System (UMTS) and Worldwide Interoperability for Microwave Access (WiMAX), evolutions thereof or the like.

The system 100 may be said to comprise a user equipment 110. This may mean that the user equipment 110 is present in the operator network 101, such as attached thereto, connected thereto or the like. In a similar manner multiple user equipments may be connected (not shown here for simplicity). The user equipment 110 may thus refer to any electronic communication device capable of connecting to the operator network 101.

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Furthermore, the system 100 and/or the operator network 101 may comprise a user data node 120, shown as UPF, an AMF 130, a session node 140 (SMF), a policy node 150, shown as PCF, a NEF 160 and a storage node 180, shown as UDR, User Data Repository. These functions, or entities, may have their known functionality in addition to what is described below.

The user data node 120 may handle deep packet inspection and service classification, which requires updated rules from the policy node 150 in order to classify traffic from UE 110 properly and to apply, for instance, desired QoS, charging and/or the like.

The policy node 150 may take policy decisions and manages charging based on so called charging rules according to known manners.

The system 100 may comprise an application node 170, shown as SCS/AS, which may host an application 190. The application 190 may provide a service, such as streaming of video, providing sensor data, providing any information on request, being able to receive any information for storage etc. The application 190 may implement any service provided by an OTT, ASP or the like. Expressed differently, the application node 170 may host a server, e.g. providing the aforementioned service, while communicating with the operator network 101 through T8 interface, which is known from 3GPP-terminology. The application 190 may thus refer to a service, such as Youtube, Vimeo, etc. Sometimes the term OTT, ASP/OTT may be used interchangeably with "application 190".

Furthermore, the user data node 120 may manage forwarding of user data, or traffic, to/from the user equipment 110 from/to the application 190 hosted by the application node 170.

The UE 110 may wish to access content provided by the application 190, which in response thereto may provide the content in the form of traffic towards the UE 110.

Additionally, the user equipment 110 may host a client application (app) 115, which may act as a client to the application 190.

Before proceeding with the description of the embodiments herein, some terms and expressions are discussed.

User filtering information refers to information provided by an end user, e.g. via a web portal, a customer service center or the like, concerning which category of content to be allowed or to be blocked for a particular subscriber, e.g. acting as end user, with respect to a certain application or service, such as YouTube, Spotify, Vimeo, etc. The particular subscriber may be identified by IMSI, Mobile Station International Subscriber Directory Number (MSISDN) or the like.

Application content information refers to information provided by the OTT, via T8 interface, concerning which category of content/traffic is provided and also when and whether application/service is capable of notifying and/or adapting content.

Control Session and PDN/PDU session are synonyms and refer to what happens in terms of signalling when the user equipment 110 is switched on and attached to the operator network 101.

Application session may refer to what happens when the end user opens the app 115 in the user equipment 110.

Figure 2A:
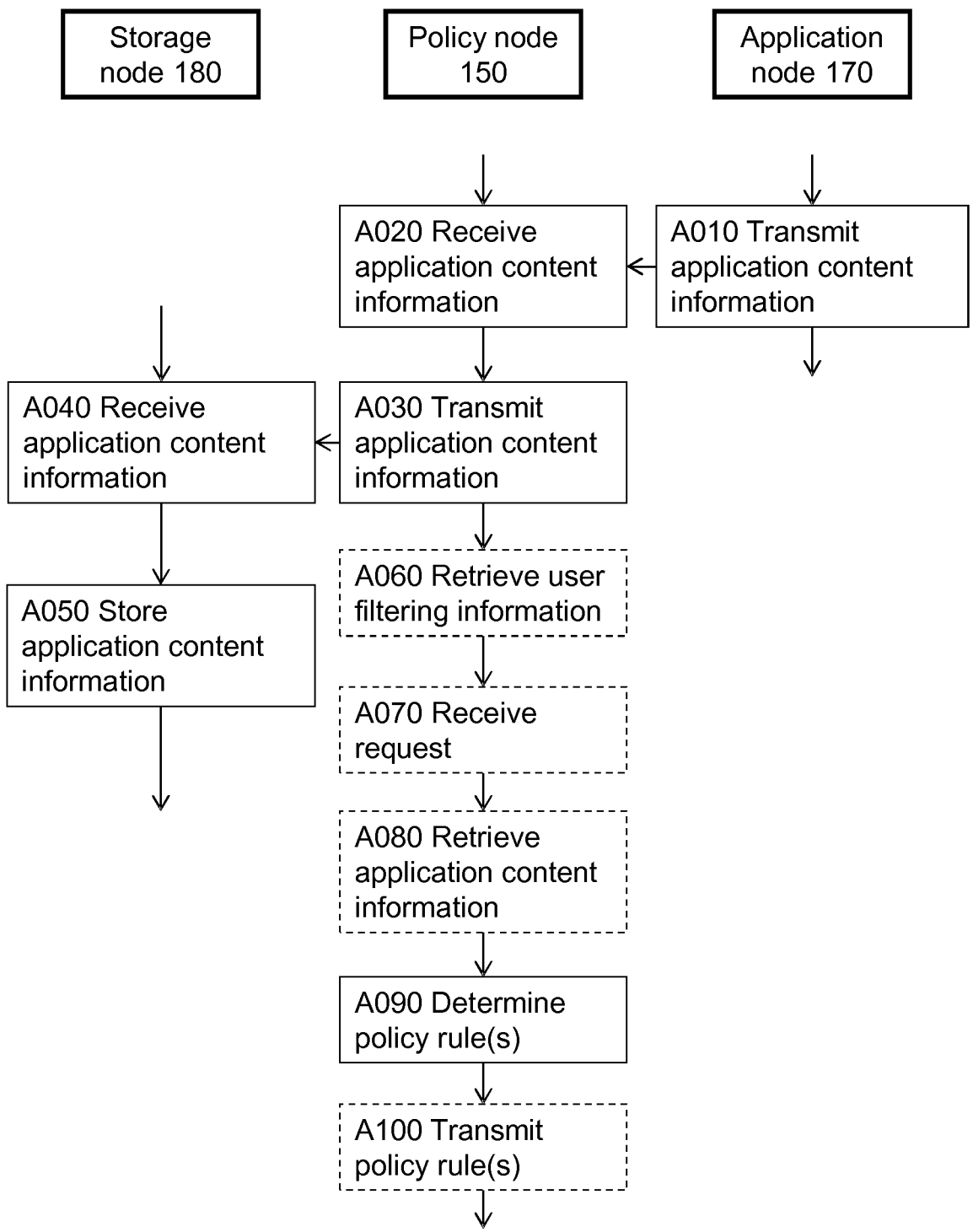
FIGS. 2a and 2b are combined signaling and flowcharts illustrating the methods herein.
Figure 2B:
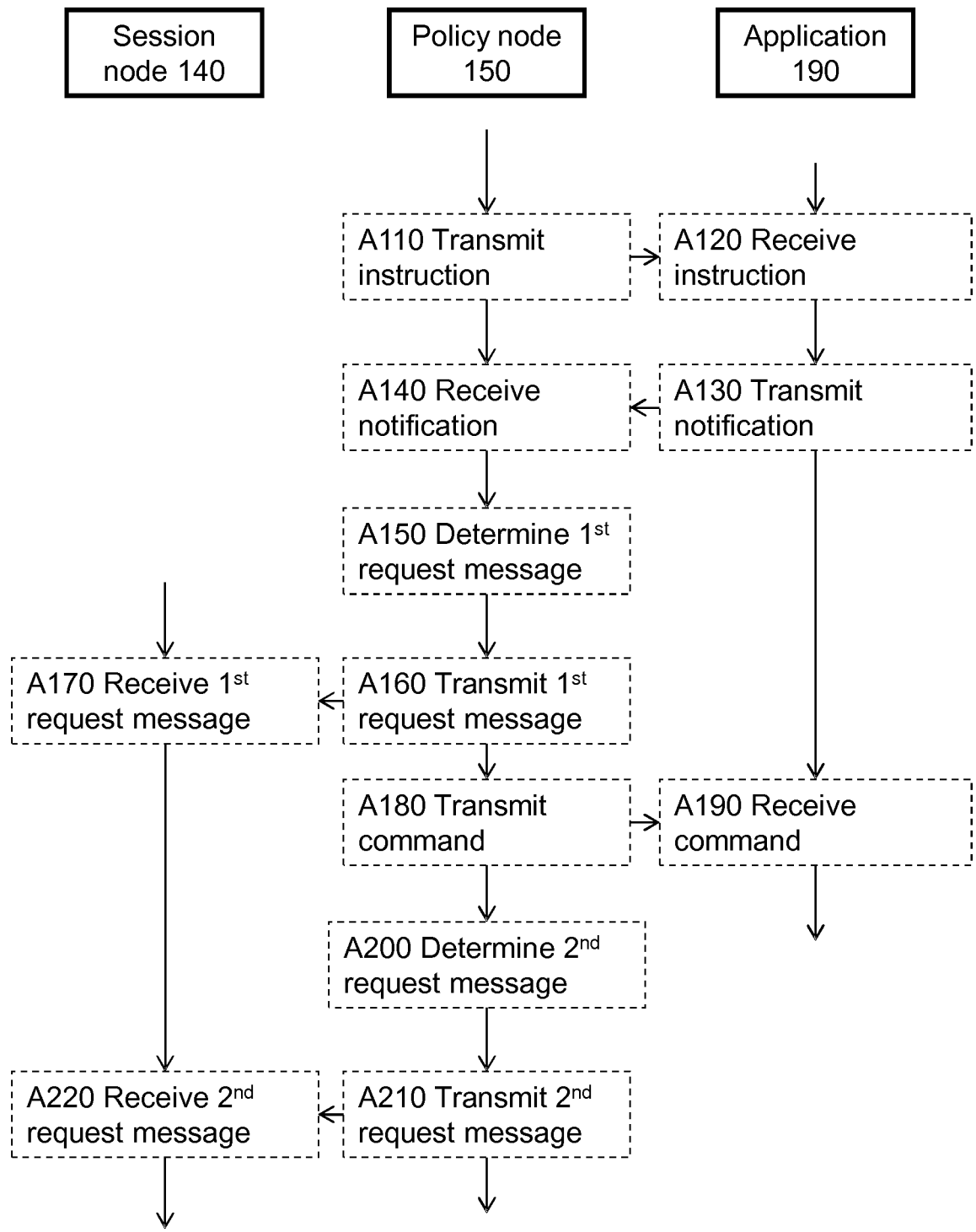

FIG. 2a and FIG. 2b illustrate an exemplifying method according to embodiments herein when implemented in the system 100 of FIG. 1.

The policy node 150 performs a method for enabling filtering of traffic from the application 190 hosted by the application node 170 towards, i.e. typically via the NEF 160, the user equipment 110.

The application node 170 performs a method for enabling filtering of traffic from the application 190 towards the user equipment 110.

The storage node 180 performs a method for enabling filtering of traffic from the application 190 hosted by an application node 170 towards the user equipment 110.

According to the scenario of FIG. 2a, action A010 to action A050 are part of a provisioning procedure, which may occur any time before the user equipment 110 seeks to access content provided by the application 190 via the operator network 101. Subsequently to the provisioning procedure, the user equipment 110 may seek access to content, thereby causing at least action A070 to be performed.

One or more of the following actions may be performed in any suitable order.

Action A010

In order for the OTT to make the operator network 101 aware of which one or more content categories, content provided by the application 190 may be associated with, the application node 170 transmits, towards the policy node 150, application content information relating to the filtering of the traffic and an identifier of the application 190 to which the application content information applies. The application content information comprises an indication relating to application content category and one or more of an adaptability indicator specifying whether the application 190 is able to adapt the traffic to a given user content category, and a notification indicator specifying whether the application 190 is able to notify, to the policy node 150, an application content category before providing requested traffic. In some examples, the application content information may comprise a time indicator specifying a time period during which application content category is valid.

In this manner, the application node 170 provisions the application content information towards the policy node 150 PCF via the NEF 160.

The application content information may be transferred over the so called T8 interface.

As an example, the T8 interface may define the following parameters according to at least some embodiments herein:
  scsAsId (SCS/AS Identifier).
  externalAppId (External Application Identifier/s) as an example of the identifier of the application 190. This field identifies which SCS/AS application/s that is/are subject to content filtering according to the embodiments herein. This external application identifiers (externalAppIds) are translated into internal application identifiers (appId) by the NEF/SCEF 160. As further examples, the identifier of the application 190 may be one of more of the externalAppId, appId, SNI, IP address of the application 190 or the like.
  Packet Flow Descriptions (PFDs) associated with the identifier of the application 190, such as the externalAppId. This field allows the operator to identify the application's traffic. The OTT may include the PFD via the T8 interface for notifying how to detect the application 190. The PFD may include the indication relating to application content category. This means that the indication and a value of the indication may be checked towards the category database to obtain knowledge about the category. In case, the adaptability indicator and/or the notification indicator is/are active, the indication relating to application content category may be omitted. Instead, the operator network 101 may check towards the application 190 to obtain a current content category associated with the content requested by the end user.

The PFDs, or at least the T8 interface as a whole, may thus include fields related to Content Filtering Management, or the application content information as provisioned by the SCS/AS, i.e. one or more of:

- the indication relating to application content category, aka "Content Category": e.g. adult, violence, gaming, unknown. Includes a list of content categories.
- the time indicator: period, or time of day, when the application content category given by the indication relating to application content category is valid.
- the adaptability indicator, aka "OTT content adaptability": a Boolean value that indicates if the OTT can adapt its content and which categories is able to adapt.
- the notification indicator, aka "OTT content notification": a Boolean value that indicates if the OTT can notify the category of the content that end user is going to download.

Action A020

The policy node 150 receives, from the application node 170, application content information relating to the filtering of the traffic and the identifier of the application 190 to which the application content information applies.

In this manner, the policy node 150 is provisioned with the application content information, e.g. over T8 from the application node 170, via the NEF 160, to be used for access restriction according to the embodiments herein.

Action A030

Now that the application content information has been received, the policy node 150 transmits, to the storage node 180, the application content information.

Thanks to that the storage node 180 stores the application content information, the policy node 150 is able to retrieve—at a later stage—the application content information from the storage node 180 either upon request of traffic from the application or upon establishment of, or attempt to establish, a session between the user equipment 110 and the application 190.

Action A040

Subsequent to action A030, the storage node 180 receives, from the policy node 150, the application content information.

Action A050

Now that the storage node 180 has received the application content information, the storage node 180 stores the application content information. In this manner, the application content information may be retrieved, e.g. by the policy node 150, at a later stage.

At this point, the operator network 101 may be aware of application content categories that may apply to traffic received from the application 190.

As an early hint about the detailed description to follow below, it may be noted that actions A060 through action A100 may be common for three examples, referred to as "first example, "second example" and "third example".

During an attempt, by the user equipment 110, to establish a PDU session and an application session, the PCF performs actions A060 through action A100. Thus, the method may comprise, during establishment of the application session between the user equipment 110 and the application 190, actions A060, A070, A080, A090 and A100. Notably, actions A060, A070 and A080 may be performed in any order.

Action A060

The policy node 150 may retrieve, from the storage node 180, user filtering information, comprising an indication relating to a user content category for the application 190 and for the user equipment 110. The user content category may be the aforementioned given user content category.

In this manner, the policy node 150 fetches information about the end user's preferences concerning how and what to filter. Typically, the user filtering information may have been provisioned to the storage node 180 in response to that the end user has expressed his/her preference concerning how and what to filter using a web portal, customer call center or the like as explained in more detail with reference to FIG. 3 below.

Action A070

The policy node 150 may receive, from the session node 140 (not shown in FIG. 2*a*), a request for policy rules for the traffic to be transmitted by the application 190, in response to that the user equipment 110 requests the traffic. The request may be an NPcf Request as in step 4 of FIG. 6 below.

Action A080

In order for the policy node 150 to become aware of the application content information, the policy node 150 may retrieve, from the storage node 180, the application content information.

The user filtering information may comprise a filtering policy for the user content category. The filtering policy may indicate one of deny access or allow access and optionally at least one of adapt traffic and notify the policy node 150. In this manner, the end user may obtain the possibility to specify, by means of the filtering policy, whether the user content category shall be allowed or denied according to the end users preferences.

Action A090

The policy node 150 may determine the policy rules indicating to the session node 140 whether to instruct the user data node 120 to block the traffic or to allow the traffic to pass based on the user filtering information and the application content information.

When forbidden content categories, i.e. a specified user content category shall be blocked, are specified by the user, the policy rules may indicate to the session node 140 to instruct the user data node 120 to block the traffic when the filtering policy indicates deny access and the indication relating to the user content category matches the indication relating to application content category.

When allowed content categories are specified by the user, the policy rules may indicate to the session node 140 to instruct the user data node 120 to allow the traffic to pass when the filtering policy indicates allow access and the indication relating to the user content category matches the indication relating to application content category.

The indication relating to the user content category may match the indication relating to application content category in that these two indications relate to a same content category. That is, the user content category refers to the same content category as the application content category, where the same content category may be "adult", "violence", "child" or the like.

Action A100

The policy node 150 may transmit, to the session node 140, the policy rules. The policy rules may e.g. be included in a so called Npcf Response.

When the policy rules causes the session node 140 to instruct the user data node 120 to block the traffic, no application session will be established. When the policy rules causes the session node 140 to instruct the user data node 120 to allow the traffic, the application session will be established.

According to the first example, the indication relating to application content category may indicate a specific application content category. This means that sometimes the indication relating to application content category may indicate none or all categories or the indication may even be omitted altogether. However, as mentioned, according to the first example, the indication relating to application content category indicates a specific application content category, or a particular content category, that applies to the content provided by the application 190.

Now with reference to FIG. 2b, one or more of the following actions may be performed in any suitable order.

Action A110

When the application content information comprises the notification indicator indicating that the application 190 is able to notify, the policy node 150 may transmit, to the application 190, an instruction indicating to the application 190 to transmit the notification before transmitting the traffic requested by the user equipment 110.

Action A120

Subsequent to action A110, the application 190 may receive the instruction indicating to the application 190 to transmit the notification before transmitting the requested traffic.

Action A130

Upon receiving a request for traffic (shown as step 12 in FIG. 7), the application 190 may transmit the notification if the instructions indicates that the notification shall be transmitted before transmitting requested traffic.

According to the second example, the application content information comprises the notification indicator indicating that the application 190 is able to notify, and the indication relating to application content category indicates unspecified content category, i.e. all or no content category has been specified by the indication or the indication may have been omitted.

With the second example, the determining A090 of the policy rules may thus comprise determining the policy rules to indicate to the session node 140 to instruct the user data node 120 to allow the traffic to pass and action A140, A150 and A160 may be performed.

Action A140

The policy node 150 may receive, from the application 190, a notification indicating a notified application content category. The policy node 150 may thus receive the notification before the application 190 provides the requested traffic.

Action A150

The policy node 150 may determine a first request message indicating to the session node 140 whether to instruct the user data node 120 to block the traffic or to allow the traffic to pass based on the user filtering information and the notification.

The determining A150 of the first request message may comprise determining the first request message to indicate to the session node 140 to instruct the user data node 120 to allow the traffic to pass when the filtering policy indicates allow access and the indication relating to the user content category matches the notified application content category.

The determining A150 of the first request message may comprise determining the first request message to indicate to the session node 140 to instruct the user data node 120 to block the traffic when the filtering policy indicates deny access and the indication relating to the user content category matches the notified application content category.

Action A160

Subsequent to action A150, the policy node 150 may transmit the first request message to the session node 140. The first request message may be a so called Nsmf Request.

Action A170

Subsequent to action A160, the session node 140 may receive the first request message and act accordingly as is known in the art.

According to the third example, the application content information may comprise the adaptability indicator specifying that the application 190 is able to adapt the requested traffic, and the indication relating to application content category indicates unspecified content category, and With the third example, the determining A090 of the policy rules may comprise determining the policy rules to indicate to the session node 140 to instruct the user data node 120 to allow the traffic to pass and the policy node 150 may perform action A180, A200 and A210.

Action A180

The policy node 150 may transmit, to the application 190, a command indicating to the application 190 to adapt the requested traffic before transmitting the traffic requested by the user equipment 110. The application 190 is required to adapt the requested traffic according to the user filtering information, i.e. in particular according to the given user content category. The command may thus include the given user content category in order to information the application 190 of which category the requested traffic shall conform to, i.e. be adapted to by including content of the given user content category or by excluding content of the given user content category or the like.

Action A190

Subsequent to action A180, the application may receive the command.

Action A200

The policy node 150 may determine a second request message indicating to the session node 140 whether to instruct the user data node 120 to block the traffic or to allow the traffic to pass based on the user filtering information and/or optionally based on an adaptability response, such as an ack/nack with respect to the command. The adaptability response is shown as step 11 "OK" in FIG. 8.

The second request message may be based on the user filtering information in that the filtering policy may control whether the traffic shall be blocked or denied when the given user content category matches the application content category.

In some examples, the second request message indicates to the session node 140 to instruct the user data node 120 to block the traffic when the adaptability response indicates that the application 190 fails to adapt as requested by the command. In some other examples, the second request message indicates to the session node 140 to instruct the user data node 120 to allow the traffic when the adaptability response indicates that the application 190 is successful in adapting the traffic as requested by the command. That is, the second request message is in these examples not determined based on the user filtering information.

In some embodiments, the time indicator may be taken into account when determining to block or allow traffic.

Hence, when the application content information may comprise the time indicator specifying the time period during which the indication relating to application content category is valid, the determining A150 of the first request message and/or the determining A200 of the second request message is/are further based on the time indicator and a current time.

Action A210

The policy node 150 may transmit the second request message to the session node 140. The second request message may be an Nsmf Request.

Action A220

Subsequent to action A210, the session node 140 may receive the second request message and act accordingly as is known in the art.

Summarizing the above, the application node 170 provisions towards the operator network 101 through e.g. T8 interface and for the target application/s, i.e. the ones controlled by the application node 170, the application content information for the traffic/content to be provided. The embodiments herein may be realized by either defining a new T8 API related to Content Filtering Management (as described below) or by extending an existing T8 API, like the AsSessionWithQoS API.

An advantage with at least some embodiments herein may be that an operator of the operator network 101 may flexibly handle content filtering in terms of granularity for how to identify traffic/content provided by the application node.

Figure 3:
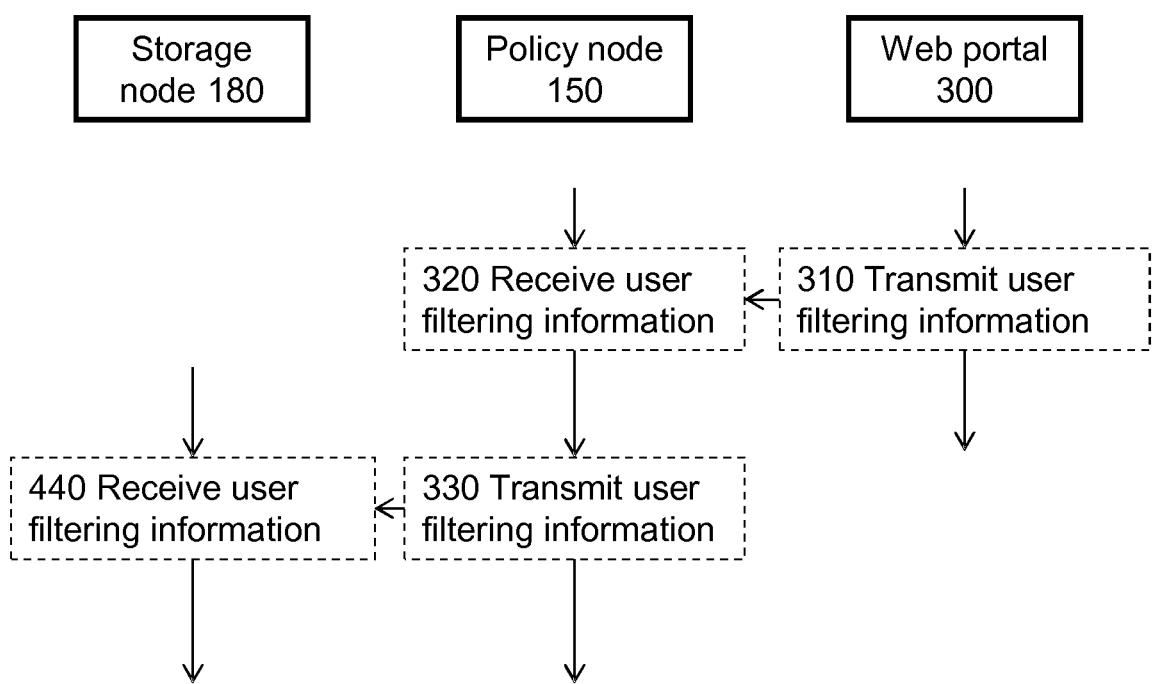
FIG. 3, FIG. 4 and FIG. 5 are further combined signaling and flowcharts illustrating more detailed examples of some embodiments herein.
Figure 4:
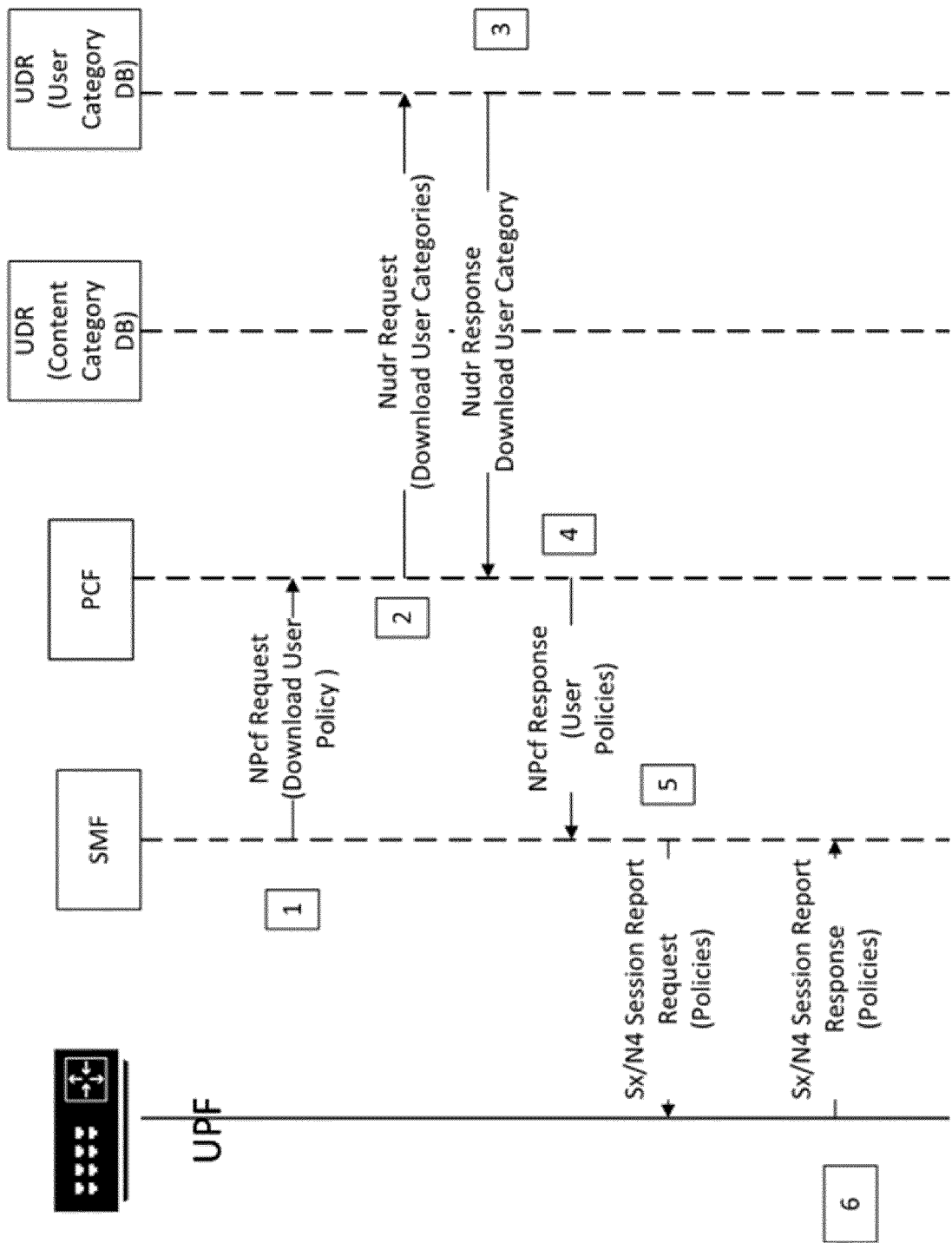
Figure 5:
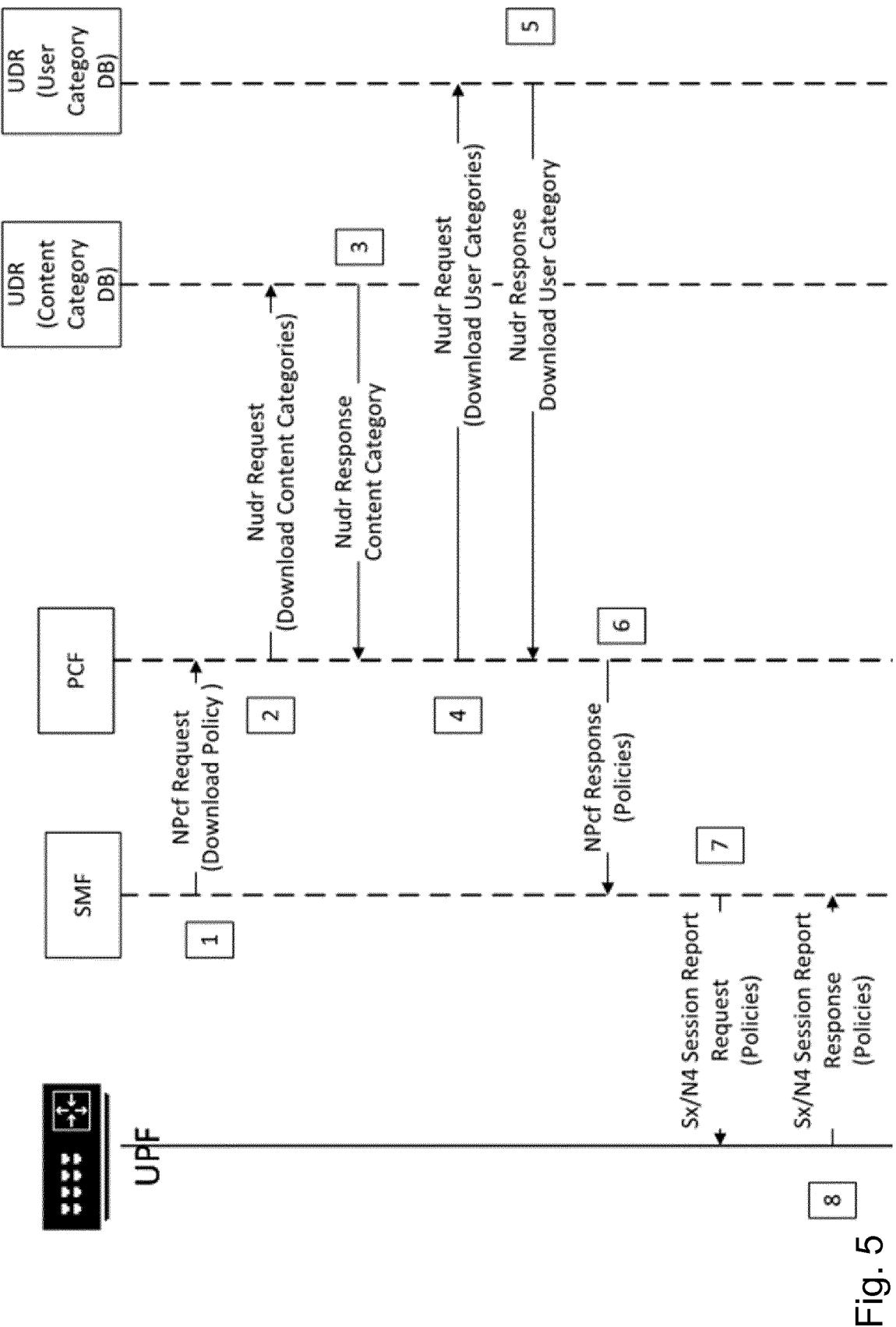

Turning to FIG. 3, FIG. 4 and FIG. 5, a more detailed description of the provisioning procedure is provided. The provisioning procedure includes provisioning of the user filtering information and/or the application content information into the storage node 180.

In FIG. 3, provisioning of user filtering information is described. In FIG. 3, a web portal 300 is illustrated. The web portal may be replaced by a customer service center, a call center, a customer chat function or the like.

The end user may provision, e.g. through the network operator's subscriber provisioning portal, the user filtering information, aka "User Category policy". The user filtering information may e.g. relate to a child's mobile phone subscription where the user filtering information indicates the content categories that should not be allowed, i.e., a content categories blacklist and optionally including time of day conditions. The user filtering information may thus indicate that categories "violence" and "adult" should be denied at all times and category "cartoons" should be denied during a time period suitable for e.g. homework. For example; watch category "sports" at 15:00-20:00, but not before going to bed to allow children to become calm and relaxed. Those categories are provisioned to the policy node 150 in the form of user filtering information. Also, the end user can include his/her own categories that he/she does not want to see.

The user filtering information is stored in the storage node 180 and retrieved when needed by the policy node 150.

Action 310

The end user expresses his/her preferences in terms of what content to allow/deny and optionally with time periods associated therewith. The web portal 300 may then provide the user filtering information to the policy node 150.

Action 320

The policy node 150 may receive the user filtering information.

Action 330

The policy node 150 may then transmit the user filtering information to the storage node 180.

Action 340

Subsequently to action A330, the storage node 180 may receive the user filtering information.

Now, in FIGS. 4 and 5, provision of application content information is illustrated. The policy node 150 is referred to as the PCF, the session node 140 is referred to as the SMF and the storage node 180 is referred to as the UDR (content category) and the UDR (user category) as applicable. Furthermore, the user data node 120 is referred to as the UPF.

The following parameters may e.g. be transferred over the T8 interface from the OTT/application 190:
  scsAsId.
  externalAppId as an example of the identifier of the application 190.
  PFDs: field and value supported by the UPF. For example, field SNI, URL, IP, and value "domain.com".
  Content Category as an example of the indication relating to application content category.
  time indicator—period when content category is valid.
  OTT Policies, possible values composed by 8 bits. The last two bits composed by the following
    0-5 bits: Reserved values for future use
    6 bit: adaptability indicator. Possible values
      TRUE (i.e. OTT can adapt the content)
      FALSE (i.e. OTT is not able to adapt the content)
    7 bit: notification indicator. Possible values
      TRUE (i.e. OTT can notify the category of the content)
      FALSE (i.e. OTT is not able to notify the category the content)

The application content information is stored in the storage node 180, shown as UDR in FIGS. 4 and 5 and it is retrieved by policy node 150 when needed.

According to standards, the UPF downloads the corresponding policies for each user from the SMF. There are two possibilities for downloading of the user filtering information (including user categories) and the application content information (including content categories).

In FIG. 4, it is illustrated that user categories are provisioned at the beginning of a control session and the content categories are provisioned once the end user tries to access the content.

In FIG. 5, it is illustrated that the user and content categories both are provisioned at the beginning of the control session.

Hence, with reference to FIG. 4, the following actions may be performed.

Action 1

The SMF requests user filtering information from the PCF.

Action 2

The PCF requests the user filtering information from the UDR (user category).

Action 3

The UDR (user category) responds by providing the user filtering information as requested.

Action 4

The PCF forwards the user filtering information in the form of user policies as a response to the SMF.

Action 5

The SMF sends the user policies to the UPF.

Action 6

The UPF responds to the SMF in the form of a session report response.

In this manner, the SMF may retrieve from user categories database, via the PCF, those user categories that are not valid (in case of deny access) for the end user. The SMF sends the user categories towards the UPF and which application 190 shall have content filtering as given by the user filtering information.

Then, for those end users with content filtering activated, when try to access a content, the UPF asks (not shown in FIG. 4) towards the SMF for the application content information (application content category) of the content and/or the application 190 using the content category database. Then the category provided by the content category database is compared with the categories of the user category database.

Hence, with reference to FIG. 5, the other option of provisioning the user filtering information and the application content information at the beginning of the application session is illustrated. A disadvantage with this approach is that it may create a great amount of policies which perhaps may not be needed. Nevertheless, the following actions may be performed.

Action 1
The SMF requests user filtering information and application content information by requesting download of a policy.

Action 2
The PCF requests the application content information from the UDR (content category).

Action 3
The UDR (content category) responds by providing the application content information to the PCF.

Action 4
The PCF requests the user filtering information from the UDR (user category).

Action 5
The UDR (user category) responds by providing the user filtering information to the PCF.

Action 6
The PCF forwards the user filtering information and the application content information in the form of policies as a response to the SMF.

Action 7
The SMF reports back to the UPF by transmitting the policies received in action 6.

Action 8
The UPF sends a response back to the SMF to confirm reception of the policies.

In the following, the first, second and third examples are described in more detail. This description shall be not been construed as limiting, but only as examples.

Referring back to the first example mentioned above, FIG. 6 illustrates a combined signalling and flowchart for the following use case: the end user attempts to access an application providing a single content that is forbidden.

The ASP/OTT, i.e. the application 190, indicates the category of the content that it is going to provide (to the UE) using the T8 and indicates how to detect the application content based on SNI. The end user attempts to access forbidden content and the ASP/OTT is not able to adapt its content.

Thus, the use case can be summarized as:
End user access to a content that is forbidden
SNI that end user tries to access is mapped to a single content category
OTT cannot adapt the content and cannot notify the category of the content One or more of the following steps may be performed.
Step 0)
The end user has provisioned in the User Category database user filtering information that indicates that this user cannot have access to content that is not for children. This action is similar to action 310 of FIG. 3.

The OTT (vimeo), or the application 190, provisions through T8 API for Content Filtering Management the following information related to vimeo application:
Vimeo provisions towards the PCF (via SCEF/NEF) the categories of each SNI
scsAsId=Vimeo Inc
externalAppId=Vimeo
PFD: field: SNI, value="vimeo.adult"
Category=adult
time indicator=* (meaning that content category is valid for the whole day)
OTT Policies:
adaptability indicator=FALSE
notification indicator=FALSE Step 1)
The end user(Child) may trigger a PDU session. As mentioned above, the SMF downloads from the PCF and the UDR the Policy rules needed for this end user. The SMF provisions towards the UPF. This action is partly similar to action A060.

In this example this end user is not allowed to access user category "adult content" as an example of the user filtering information, such as the given user content category.

As part of Step 1, i.e. concerning PDU session establishment, subscriber data in UDR may indicate the subscriber is a child, or age of subscriber, that is subject to content filtering. Based on this, the SMF may instruct the UPF to notify when e.g. Vimeo application traffic is detected (and to report the detected SNI to check if the content is appropriate or not).

Step 2)
The end user may open Vimeo app using the SNI=vimeo.adult

Step 3-4)
The UPF may know from step 1 that this application for this user has content filtering activated. The UPF may detect SNI and may notify the PCF via the SMF indicating that it is Vimeo, sending SNI=vimeo.adult. The UPF may also send subscriber information like the MSISDN, IMSI or user IP address.

Step 5)
The PCF may check that this user has parental control activated. The PCF may check towards the content category database what is the category for this SNI. PCF sends the SNI and asks for the content category of this specific SNI. This action is similar to action A030.

Step 6)
The category database may indicate to PCF that the category is adult.

Step 7)
The PCF may check that this user is not allowed to watch adult content according to the downloaded user categories of step 1. The PCF may notify towards the SMF that this flow should be blocked. This action may be partly similar to action A100.

Step 8)
The SMF may notify to the UPF that this flow should be blocked

Step 9)
The UPF may block the content (packet drop) and optionally reset the connection Referring back to the second example mentioned above, FIG. 7 illustrates a combined signalling and flowchart for the following use case: end user access to a content that is classified as multiple content categories.

The ASP/OTT indicates the category of the content that is going to provide using the T8 and indicates how to detect the application content based on SNI. The end user makes access to forbidden content which has multiple categories (i.e. simple categorization based on SNI does not serve) and the ASP/OTT is not able to adapt its content.

Thus, the use case can be summarized as:

End user access to a content that is forbidden

SNI that end user tries to access is mapped to multiple content category. So, the content that end user wants to see cannot be categorized looking at the SNI OTT cannot adapt the content. OTT can notify the category of the content One or more of the following steps may be performed.

Figure 6:
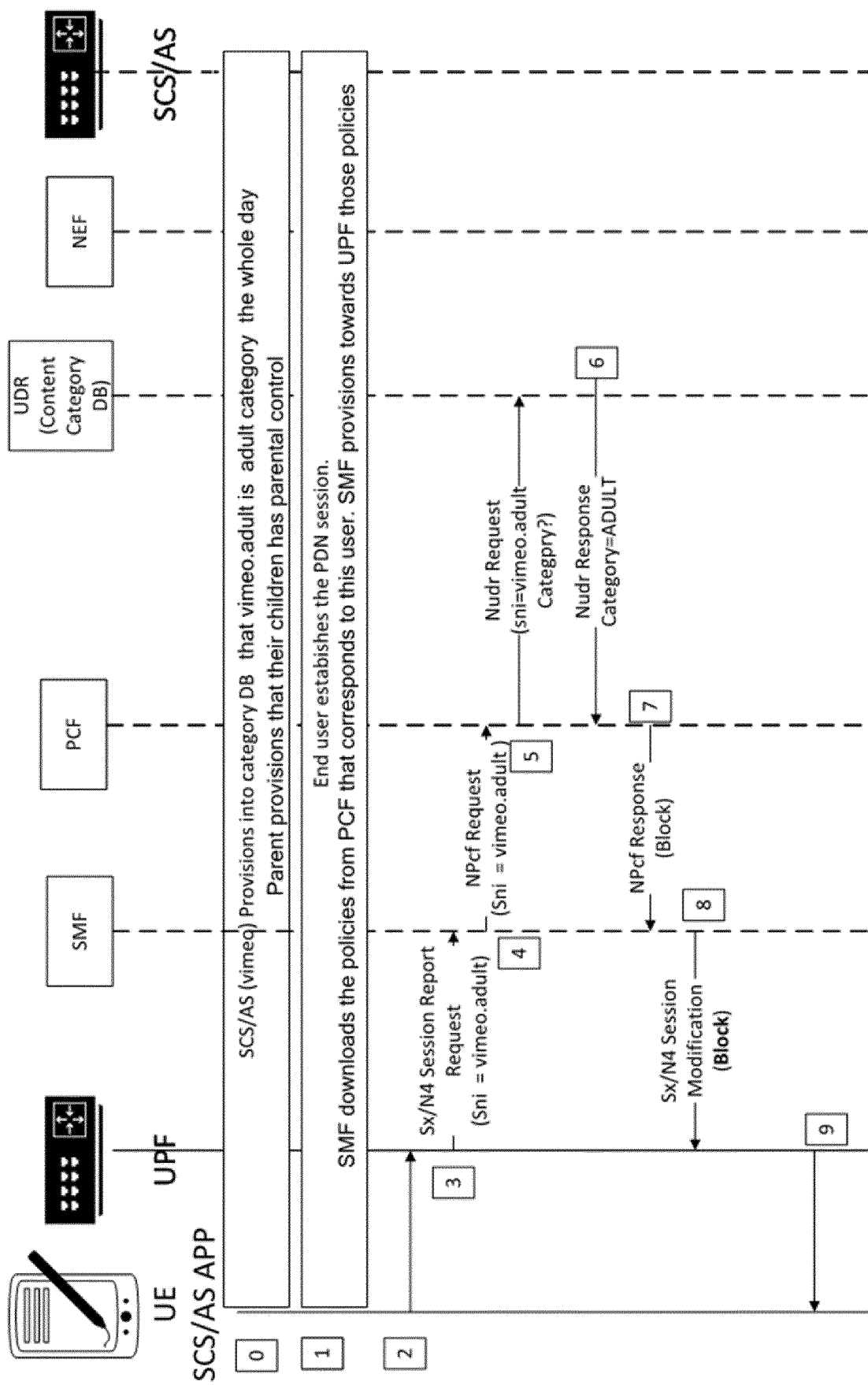
FIG. 6 is a combined signaling and flowchart illustrating a first example according to some embodiments herein.
Figure 7:
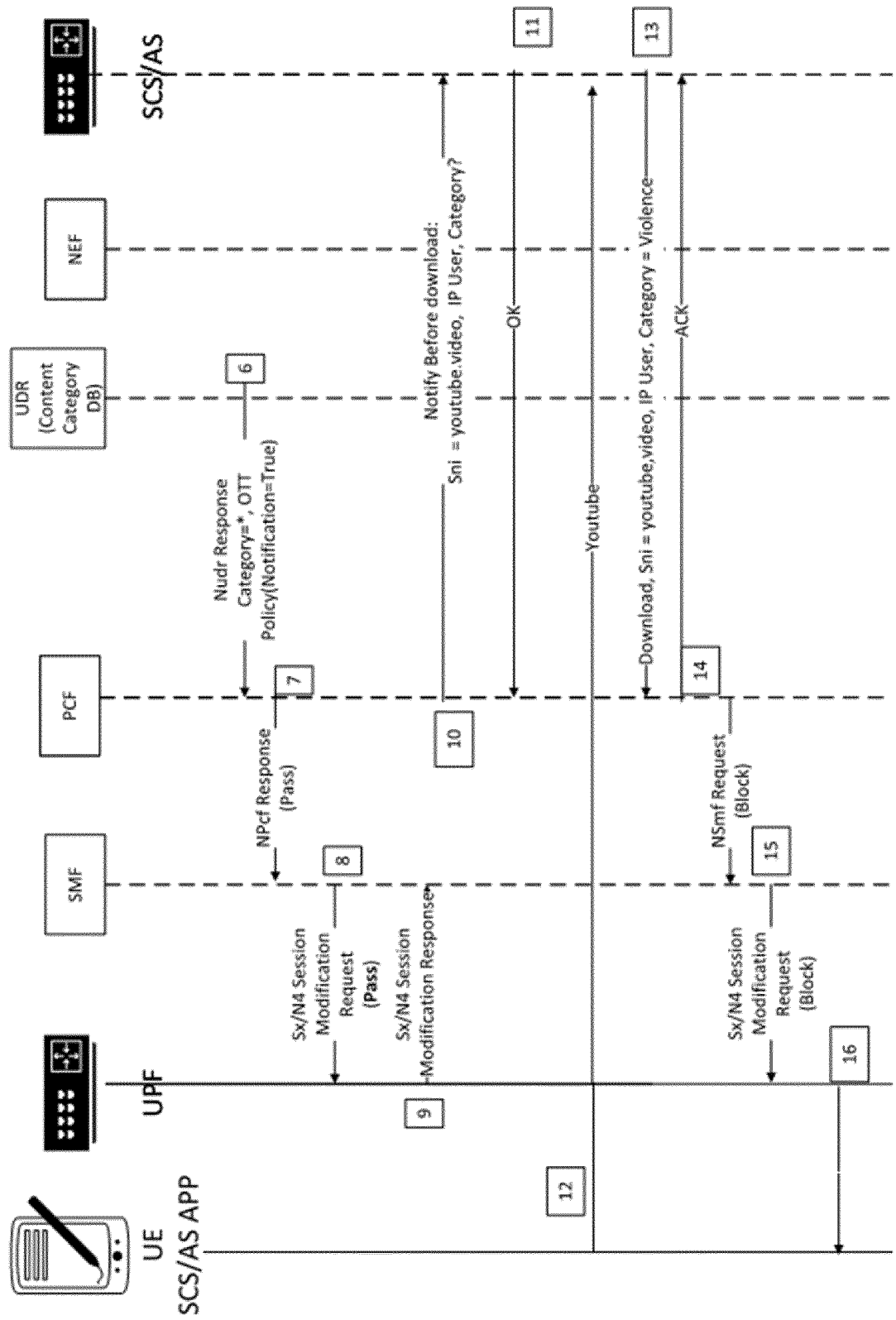
FIG. 7 is a combined signaling and flowchart illustrating a second example according to some embodiments herein.

Note that FIG. 7 has omitted step 0) to step 5), since these steps can be understood from FIG. 6. The same mapping to the actions of FIGS. 2a and 2b may be applicable.

Step 0)

The end user may have provisioned in the User Category database that this user cannot have access to content that is not for children.

The OTT, such as Youtube, provisions towards the PCF (via SCEF/NEF) the categories of each SNI:

scsAsId=Youtube Inc
externalAppId=Youtube
PFD: field: SNI, value="youtube.video"
Category=*
time indicator=* (meaning that content category is valid for the whole day)
OTT Policies:
  adaptability indicator=FALSE
  notification indicator=TRUE Step 1)

The end user(Children) may trigger a PDU session.

As the end user defined in the user filtering information at the beginning of the PDU session, the SMF may download from the PCF the policy rules needed for this end user. The policy rules may have been determined by the PCF using the application content information and/or the user filtering information. The SMF may provision the policy rules towards the UPF.

In this example this end user is not allowed to adult content.

Step 2)

The end user may open Youtube app using the SNI=youtube.video

Step 3-4)

The UPF may detect SNI and notifies PCF via SMF indicating that is Youtube, sending SNI=youtube.video. It may also send subscriber information like the MSISDN, IMSI or user IP address.

Step 5)

The PCF may check that this user has parental control activated. The PCF may check towards the content category database what is the category for this SNI. The PCF may send the SNI and may ask for the content category of this specific SNI Step 6)

The category database may indicate to the PCF that the category is all. So, the content that this user is going to access cannot be categorized. But, the category database indicates that the OTT may allow notification of the category once the user tries to access to the content Step 7)

The PCF may check that this user has content management according to the downloaded user categories of step 1. The PCF may notify towards the UPF that this flow should pass because the OTT may notify the content category.

Step 8)

The SMF may notify to the UPF that this flow should be passed

Step 9)

The UPF may ack the previous request from the SMF

Step 10)

This step may be done at the same moment that step 7. The PCF may send towards the OTT passing through the NEF the order, or command, of notifying before download. With this option, the OTT may send the category of the content that the end user is going to download before providing the requested content/traffic. The PCF may send towards the OTT, the SNI of the end user and data of the end user communication like IP user, source port, destination port, etc. This action may be similar to action A110.

Step 11)

The OTT may confirm the previous request

Step 12)

The end user may access YouTube using the SNI youtube.video

Step 13)

The OTT may check that the end user access and notify the category of the content that end user wish to access towards the PCF passing through different nodes of the network like the NEF. This action may be partly similar to action A130 and A140.

Step 14)

The PCF may acknowledge the request. The PCF may notify towards SMF that this flow should be blocked. This action may be similar to action A160 and action A170.

Step 15)

The SMF may notify to the UPF that this flow should be blocked.

Step 16)

The UPF may block the content (packet drop) and optionally resets the connection Referring back to the third example mentioned above, FIG. 8 illustrates a combined signalling and flowchart for the following use case: end user access to an application whose content can be adapted.

The ASP/OTT indicates the category of the content that is going to provide using the T8 and indicates how to detect the application content based on SNI. The end user access to forbidden content which has multiple categories (i.e. simple content categorization based on SNI does not serve). The OTT can adapt its content, and the NSP exposes some data towards the OTT. According to this data, the OTT adapts its content accordingly.

Thus, the use case can be summarized as:

The end user access to a content that is forbidden

No PFD for detecting the category content is needed. The UPF detects the application and notify towards the PCF (using the SMF)

The OTT can adapt the content.

One or more of the following steps may be performed.

Figure 8:
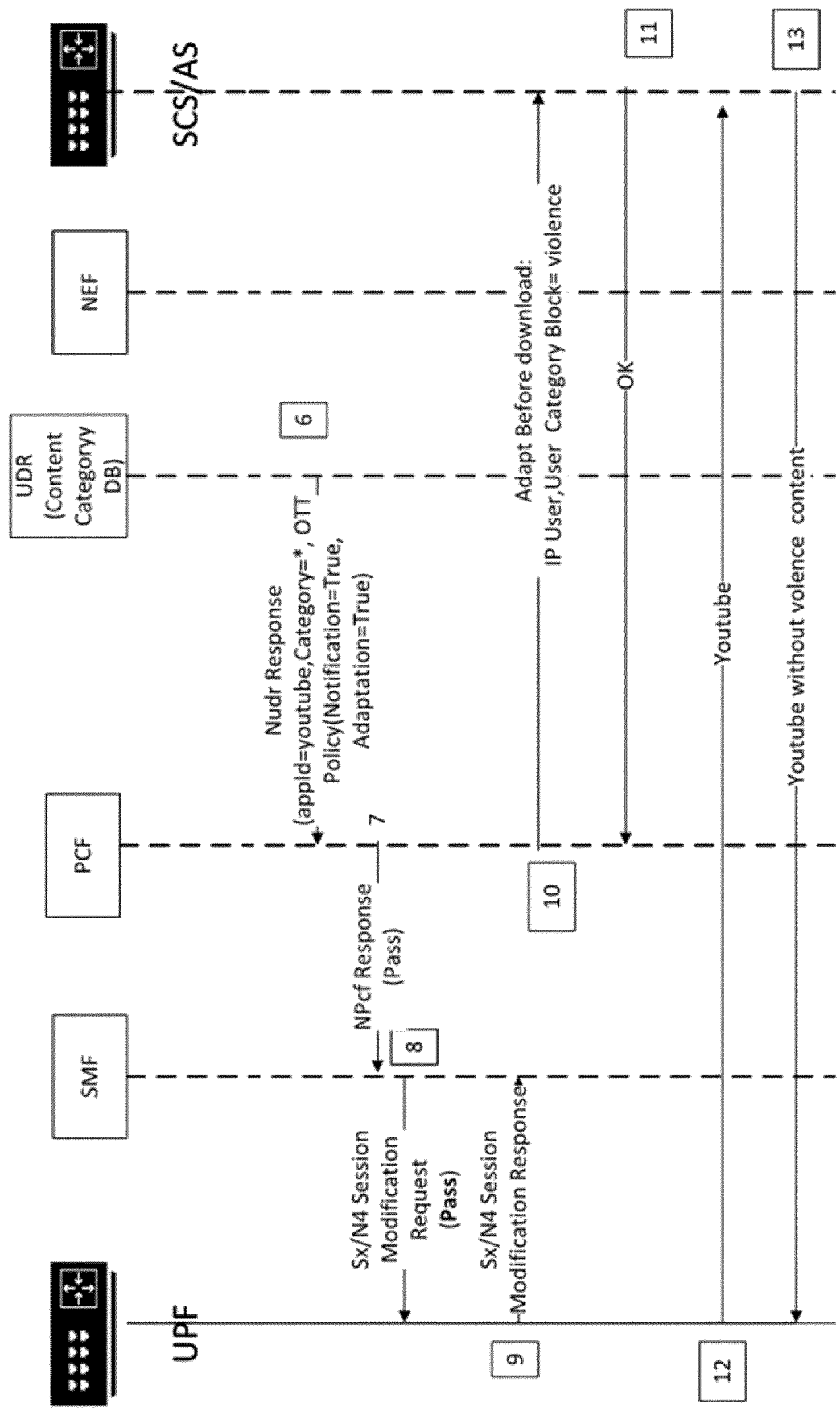
FIG. 8 is a combined signaling and flowchart illustrating a third example according to some embodiments herein.

Note that FIG. 8 has omitted step 0) to step 5), since these steps can be understood from FIG. 6, while it is noted that the SNI of FIG. 6 is replaced by the appId=Youtube in this example. The same mapping to the actions of FIGS. 2a and 2b may be applicable.

Step 0)

The end user may have provisioned the user filtering information in the User Category database that this user does not like violence content.

The OTT, such as YouTube, provisions towards the PCF, via SCEF/NEF, the categories of each appId:

scsAsId=Youtube Inc
externalAppId=Youtube
Category=* time indicator=* (meaning that content category is valid the entire day)
OTT Policies:
    adaptability indicator=TRUE
    notification indicator=TRUE Step 1)

The end user may trigger a PDU session. The UPF may download from the PCF via the SMF the policy rules needed for this end user. The PCF knows from the UDR (User Category database) that this user does not like violence content. DB is an abbreviation for database in the Figure.

Step 2)

The end user may open Youtube app

Step 3-4)

The UPF may detect Youtube application according to the PFD rules and may notify the PCF via the SMF indicating that is Youtube, sending appId=youtube. It also sends subscriber information like the MSISDN, IMSI or user IP address.

Step 5)

The PCF may check that is user does not want violence content. The PCF may check towards the content category database what is the category and policy for this application. The PCF may send the application id and asks for the content category and policy for this application.

Step 6)

The category database may indicate to the PCF that the category is all. So, the content that this user is going to access cannot be categorized. But, the category database indicates that the OTT may allow notification of the category and adaptation.

Step 7)

The PCF may check that this end user has content management according to the downloaded user categories of step 1. The PCF may notify towards the UPF that this flow should pass because the OTT can adapt the content.

Step 8)

The SMF may notify to the UPF that this flow should be passed

Step 9)

The UPF may ack the previous request from the SMF.

Step 10)

This step may be done at the same moment that step 7. The PCF may send towards the OTT passing through the NEF the order of Adapt before download. The PCF may send towards the OTT, the category (user category) that should be adapted and data of the end user communication like IP user, source port, destination port, etc. This action may be partly similar to action A180 and action A190.

Step 11)

The OTT may confirm the previous request

Step 12)

The end user (or user equipment 110—not shown in FIG. 8, reference is made to FIG. 7) may access YouTube, since the flow/traffic/content shall be allowed to pass e.g. as instructed by the PCF to the SMF by action A210 and action A220.

Step 13)

The end user may see YouTube traffic without violence content.

Figure 9:
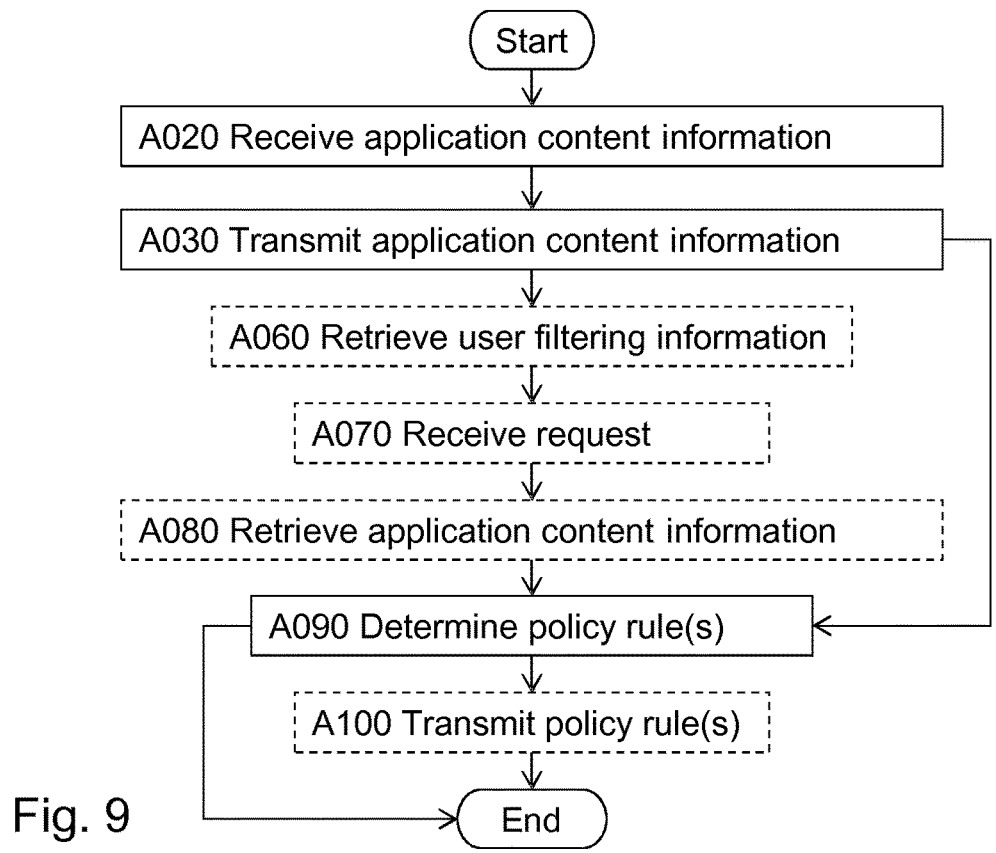
FIG. 9 is a flowchart illustrating embodiments of the method in the policy node.

In FIG. 9, a schematic flowchart of exemplifying methods in the policy node 150 is shown. Again, the same reference numerals as above have been used to denote the same or similar features, in particular the same reference numerals have been used to denote the same or similar actions. Accordingly, the policy node 150 performs a method for enabling filtering of traffic from an application 190 hosted by an application node 170 towards a user equipment 110.

One or more of the following actions may be performed in any suitable order.

Action A020

The policy node 150 receives, from the application node 170, application content information relating to the filtering of the traffic and an identifier of the application 190 to which the application content information applies. The application content information comprises an indication relating to application content category of the traffic, and wherein the application content information comprises one or more of: an adaptability indicator specifying whether the application 190 is able to adapt the traffic to a given user content category, and a notification indicator specifying whether the application 190 is able to notify, to the policy node 150, an application content category before providing requested traffic.

The application content information may comprise a time indicator specifying a time period during which application content category is valid.

The indication relating to application content category may indicate a specific application content category or may indicate an unspecified application content category.

Action A030

The policy node 150 transmits, to a storage node 180, the application content information.

The method may comprise, during establishment of an application session between the user equipment 110 and the application 190, actions A060, A070, A080, A090 and A100.

Action A060

The policy node 150 may retrieve, from the storage node 180, user filtering information, comprising an indication relating to a user content category for the application 190 and for the user equipment 110.

The user filtering information may comprise a filtering policy for the user content category. The filtering policy may indicate one of deny access or allow access and optionally at least one of adapt traffic and notify the policy node 150.

Action A070

The policy node 150 may receive, from the session node 140, a request for policy rules for the traffic to be transmitted by the application 190, in response to that the user equipment 110 requests the traffic.

Action A080

The policy node 150 may retrieve, from the storage node 180, the application content information comprising the indication relating to application content category for the traffic identified by the identifier of the application 190.

Action A090

The policy node 150 may determine the policy rules indicating to the session node 140 whether to instruct a user data node 120 to block the traffic or to allow the traffic to pass based on the user filtering information and the application content information.

The policy rules may indicate to the session node 140 to instruct the user data node 120 to block the traffic when the filtering policy indicates deny access and the indication relating to the user content category matches the indication relating to application content category.

Action A100

The policy node 150 may transmit, to the session node 140, the policy rules.

Action A110

When the application content information comprises the notification indicator indicating that the application 190 is able to notify, the policy node 150 may transmit, to the application 190, an instruction indicating to the application 190 to transmit the notification before transmitting the traffic requested by the user equipment 110.

When the application content information comprises the notification indicator indicating that the application 190 is able to notify, and the indication relating to application content category indicates unspecified content category, the determining A090 of the policy rules may comprise determining the policy rules to indicate to the session node 140 to instruct the user data node 120 to allow the traffic to pass and the method comprises:

Action A140

The policy node 150 may receive, from the application 190, a notification indicating a notified application content category.

Action A150

The policy node 150 may determine a first request message indicating to the session node 140 whether to instruct the user data node 120 to block the traffic or to allow the traffic to pass based on the user filtering information and the notification.

The determining A150 of the first request message may comprise determining the first request message to indicate to the session node 140 to instruct the user data node 120 to allow the traffic to pass when the filtering policy indicates allow access and the indication relating to the user content category matches the notified application content category.

The determining A150 of the first request message may comprise determining the first request message to indicate to the session node 140 to instruct the user data node 120 to block the traffic when the filtering policy indicates deny access and the indication relating to the user content category matches the notified application content category.

Action A160

The policy node 150 may transmit the first request message to the session node 140.

When the application content information may comprise the adaptability indicator specifying that the application 190 is able to adapt the requested traffic, and the indication relating to application content category indicates unspecified content category, the determining A090 of the policy rules may comprise determining the policy rules to indicate to the session node 140 to instruct the user data node 120 to allow the traffic to pass, the policy node 150 may perform action A180, A200 and A210.

Action A180

The policy node 150 may transmit, to the application 190, a command indicating to the application 190 to adapt the requested traffic before transmitting the traffic requested by the user equipment 110. The application 190 is required to adapt the requested traffic according to the user filtering information.

Action A200

The policy node 150 may determine a second request message indicating to the session node 140 whether to instruct the user data node 120 to block the traffic or to allow the traffic to pass based on the user filtering information.

In some examples, the application content information may comprise the time indicator specifying the time period during which the indication relating to application content category is valid. Then, the determining A150 of the first request message and/or the determining A200 of the second request message is/are further based on the time indicator and a current time.

Action A210

The policy node 150 may transmit the second request message to the session node 140.

Figure 10:
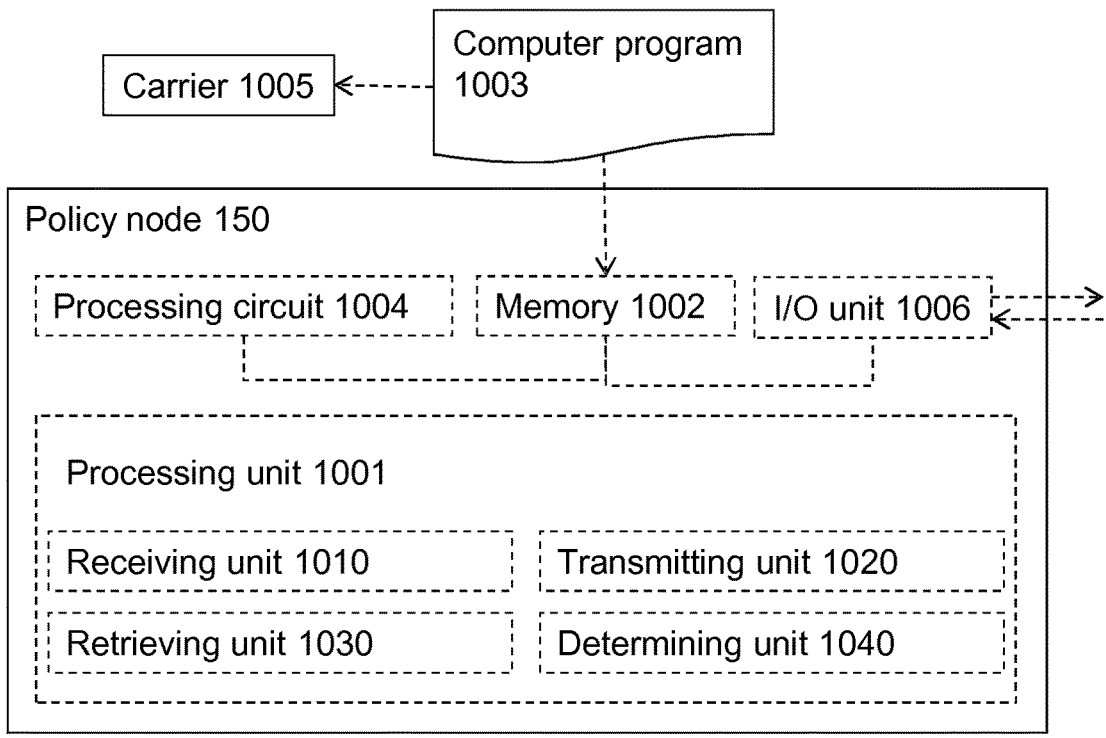
FIG. 10 is a block diagram illustrating embodiments of the policy node.

With reference to FIG. 10, a schematic block diagram of embodiments of the policy node 150 of FIG. 1 is shown.

The policy node 150 may comprise a processing unit 1001, such as a means for performing the methods described herein. The means may be embodied in the form of one or more hardware units and/or one or more software units. The term "unit" may thus refer to a circuit, a software block or the like according to various embodiments as described below.

The policy node 150 may further comprise a memory 1002. The memory may comprise, such as contain or store, instructions, e.g. in the form of a computer program 1003, which may comprise computer readable code units.

According to some embodiments herein, the policy node 150 and/or the processing unit 1001 comprises a processing circuit 1004 as an exemplifying hardware unit, which may comprise one or more processors. Accordingly, the processing unit 1001 may be embodied in the form of, or 'realized by', the processing circuit 1004. The instructions may be executable by the processing circuit 1004, whereby the policy node 150 is operative to perform the methods of FIGS. 2a and 2b and/or FIG. 9. As another example, the instructions, when executed by the policy node 150 and/or the processing circuit 1004, may cause the policy node 150 to perform the method according to FIGS. 2a and 2b and/or FIG. 9.

In view of the above, in one example, there is provided a policy node 150 for enabling filtering of traffic as disclosed herein. Again, the memory 1002 contains the instructions executable by said processing circuit 1004 whereby the policy node 150 is operative to perform the method of FIG. 9.

FIG. 10 further illustrates a carrier 1005, or program carrier, which provides, such as comprises, mediates, supplies and the like, the computer program 1003 as described directly above. The carrier 1005 may be one of an electronic signal, an optical signal, a radio signal and a computer readable medium.

In some embodiments, the policy node 150 and/or the processing unit 1001 may comprise one or more of a receiving unit 1010, a transmitting unit 1020, a retrieving unit 1030, and a determining unit 1040 as exemplifying hardware units. The term "unit" may refer to a circuit when the term "unit" refers to a hardware unit. In other examples, one or more of the aforementioned exemplifying hardware units may be implemented as one or more software units.

Moreover, the policy node 150 and/or the processing unit 1001 may comprise an Input/Output unit 1006, which may be exemplified by the receiving unit and/or the transmitting unit when applicable.

Accordingly, the policy node 150 is configured for enabling filtering of traffic from an application 190 hosted by an application node 170 towards a user equipment 110. The policy node 150 and/or the processing unit 1001 and/or the receiving unit 1010 and/or the processing circuit 1004 is configured for receiving, from the application node 170, application content information relating to the filtering of the traffic and an identifier of the application 190 to which the application content information applies. The application content information comprises an indication relating to application content category of the traffic, and wherein the application content information comprises one or more of an adaptability indicator specifying whether the application 190 is able to adapt the traffic to a given user content category, and a notification indicator specifying whether the application 190 is able to notify, to the policy node 150, an application content category before providing requested traffic. The policy node 150 and/or the processing unit 1001 and/or the transmitting unit 1010 and/or the processing circuit 1004 is configured for transmitting, to a storage node 180, the application content information.

The application content information may comprise a time indicator specifying a time period during which application content category is valid.

The policy node 150 etc. is configured for, during establishment of an application session between the user equipment 110 and the application 190 as follows:

The policy node 150 and/or the processing unit 1001 and/or the retrieving unit 1010 and/or the processing circuit 1004 may be configured for retrieving, from the storage node 180, user filtering information, comprising an indication relating to a user content category for the application 190 and for the user equipment 110.

The policy node 150 and/or the processing unit 1001 and/or the receiving unit 1010 and/or the processing circuit 1004 may be configured for receiving, from a session node 140, a request for policy rules for the traffic to be transmitted by the application 190, in response to that the user equipment 110 requests the traffic.

The policy node 150 and/or the processing unit 1001 and/or the retrieving unit 1010 and/or the processing circuit 1004 may be configured for retrieving, from the storage node 180, the application content information comprising the indication relating to application content category for the traffic identified by the identifier of the application 190.

The policy node 150 and/or the processing unit 1001 and/or the determining unit 1010 and/or the processing circuit 1004 may be configured for determining the policy rules indicating to the session node 140 whether to instruct a user data node 120 to block the traffic or to allow the traffic to pass based on the user filtering information and the application content information.

The policy node 150 and/or the processing unit 1001 and/or the transmitting unit 1010 and/or the processing circuit 1004 may be configured for transmitting, to the session node 140, the policy rules.

The indication relating to application content category may indicate a specific application content category.

The user filtering information may comprise a filtering policy for the user content category. The filtering policy may indicate one of deny access or allow access and optionally at least one of adapt traffic and notify the policy node 150.

The policy rules may indicate to the session node 140 to instruct the user data node 120 to block the traffic when the filtering policy indicates deny access and the indication relating to the user content category matches the indication relating to application content category.

In some embodiments, the application content information comprises the notification indicator indicating that the application 190 is able to notify, and the indication relating to application content category indicates unspecified content category. The policy node 150 etc. is configured for determining the policy rules by determining the policy rules to indicate to the session node 140 to instruct the user data node 120 to allow the traffic to pass.

In these embodiments, the policy node 150 and/or the processing unit 1001 and/or the receiving unit 1010 and/or the processing circuit 1004 may be configured for receiving, from the application 190, a notification indicating a notified application content category.

The policy node 150 and/or the processing unit 1001 and/or the determining unit 1010 and/or the processing circuit 1004 may be configured for determining a first request message indicating to the session node 140 whether to instruct the user data node 120 to block the traffic or to allow the traffic to pass based on the user filtering information and the notification.

The policy node 150 and/or the processing unit 1001 and/or the transmitting unit 1010 and/or the processing circuit 1004 may be configured for transmitting the first request message to the session node 140.

The policy node 150 etc. may be configured for determining the first request message by determining the first request message to indicate to the session node 140 to instruct the user data node 120 to allow the traffic to pass when the filtering policy indicates allow access and the indication relating to the user content category matches the notified application content category.

The policy node 150 etc. may be configured for determining the first request message by determining the first request message to indicate to the session node 140 to instruct the user data node 120 to block the traffic when the filtering policy indicates deny access and the indication relating to the user content category matches the notified application content category.

When the application content information comprises the notification indicator indicating that the application 190 is able to notify, the policy node 150 and/or the processing unit 1001 and/or the transmitting unit 1010 and/or the processing circuit 1004 may be configured for transmitting, to the application 190, an instruction indicating to the application 190 to transmit the notification before transmitting the traffic requested by the user equipment 110.

When the application content information may comprise the adaptability indicator specifying that the application 190 is able to adapt the requested traffic, and the indication relating to application content category indicates unspecified content category, then the policy node 150 may be configured for determining the policy rules by determining the policy rules to indicate to the session node 140 to instruct the user data node 120 to allow the traffic to pass. Hence, the policy node 150 and/or the processing unit 1001 and/or the transmitting unit 1010 and/or the processing circuit 1004 may be configured for transmitting, to the application 190, a command indicating to the application 190 to adapt the requested traffic before transmitting the traffic requested by the user equipment 110. The application 190 is required to adapt the requested traffic according to the user filtering information.

The policy node 150 and/or the processing unit 1001 and/or the determining unit 1010 and/or the processing circuit 1004 may be configured for determining a second request message indicating to the session node 140 whether to instruct the user data node 120 to block the traffic or to allow the traffic to pass based on the user filtering information.

The policy node 150 and/or the processing unit 1001 and/or the transmitting unit 1010 and/or the processing circuit 1004 may be configured for transmitting the second request message to the session node 140.

The application content information may comprise the time indicator specifying the time period during which the indication relating to application content category is valid. The policy node 150 may then be configured for determining the first request message and/or determining the second request message further based on the time indicator and a current time.

Figure 11:
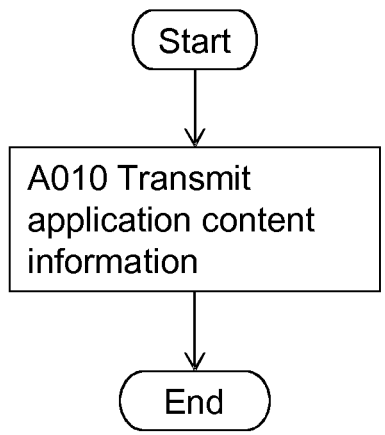
FIG. 11 is a flowchart illustrating embodiments of the method in the application node.

In FIG. 11, a schematic flowchart of exemplifying methods in the application node 170 is shown. Again, the same reference numerals as above have been used to denote the same or similar features, in particular the same reference numerals have been used to denote the same or similar actions. Accordingly, the application node 170 performs a method for enabling filtering of traffic from the application 190 towards a user equipment 110.

The following action may be performed.

Action A010

The application node 170 transmits, towards a policy node 150, application content information relating to the filtering of the traffic and an identifier of the application 190 to which the application content information applies. The application content information comprises an indication relating to application content category and one or more of an adaptability indicator specifying whether the application 190 is able to adapt the traffic to a given user content category, and a notification indicator specifying whether the application 190 is able to notify, to the policy node 150, an application content category before providing requested traffic.

Figure 12:
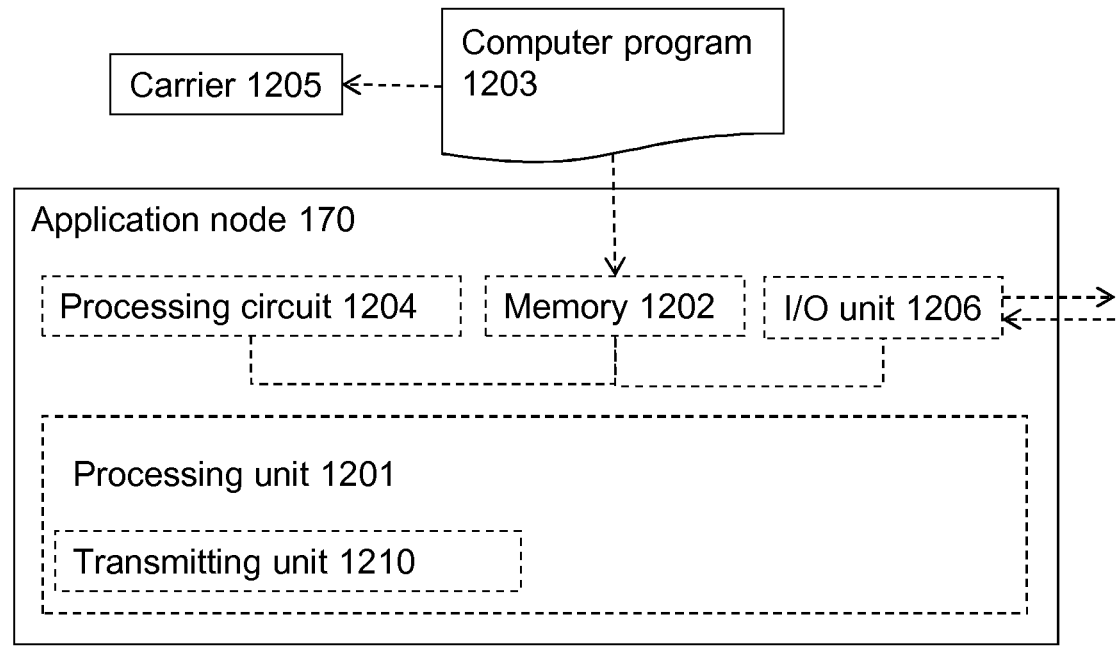
FIG. 12 is a block diagram illustrating embodiments of the application node.

With reference to FIG. 12, a schematic block diagram of embodiments of the application node 170 of FIG. 1 is shown.

The application node 170 may comprise a processing unit 1201, such as a means for performing the methods described herein. The means may be embodied in the form of one or more hardware units and/or one or more software units. The term "unit" may thus refer to a circuit, a software block or the like according to various embodiments as described below.

The application node 170 may further comprise a memory 1202. The memory may comprise, such as contain or store, instructions, e.g. in the form of a computer program 1203, which may comprise computer readable code units.

According to some embodiments herein, the application node 170 and/or the processing unit 1201 comprises a processing circuit 1204 as an exemplifying hardware unit. Accordingly, the processing unit 1201 may be embodied in the form of, or 'realized by', the processing circuit 1204. The instructions may be executable by the processing circuit 1204, whereby the application node 170 is operative to perform the methods of FIGS. 2a and 2b and/or FIG. 11. As another example, the instructions, when executed by the application node 170 and/or the processing circuit 1204, may cause the application node 170 to perform the method according to FIGS. 2a and 2b and/or FIG. 11.

In view of the above, in one example, there is provided an application node 170 for enabling filtering of traffic as disclosed herein. Again, the memory 1202 contains the instructions executable by said processing circuit 1204 whereby the application node 170 is operative to perform the method of FIG. 11.

FIG. 12 further illustrates a carrier 1205, or program carrier, which provides, such as comprises, mediates, supplies and the like, the computer program 1203 as described directly above. The carrier 1205 may be one of an electronic signal, an optical signal, a radio signal and a computer readable medium.

In further embodiments, the application node 170 and/or the processing unit 1201 may comprise one or more of a transmitting unit 1210 as exemplifying hardware units. The term "unit" may refer to a circuit when the term "unit" refers to a hardware unit. In other examples, one or more of the aforementioned exemplifying hardware units may be implemented as one or more software units.

Moreover, the application node 170 and/or the processing unit 1201 may comprise an Input/Output unit 1206, which may be exemplified by a receiving unit and/or the transmitting unit when applicable.

Accordingly, the application node 170 is configured for hosting an application 190 and configured for enabling filtering of traffic from the application 190 towards a user equipment 110.

Therefore, according to the various embodiments described above, the application node 170 and/or the processing unit 1201 and/or the transmitting unit 1210 and/or the processing circuit 1204 is configured for transmitting, towards a policy node 150, application content information relating to the filtering of the traffic and an identifier of the application 190 to which the application content information applies. The application content information comprises an indication relating to application content category and one or more of an adaptability indicator specifying whether the application 190 is able to adapt the traffic to a given user content category, and a notification indicator specifying whether the application 190 is able to notify, to the policy node 150, an application content category before providing requested traffic.

Figure 13:
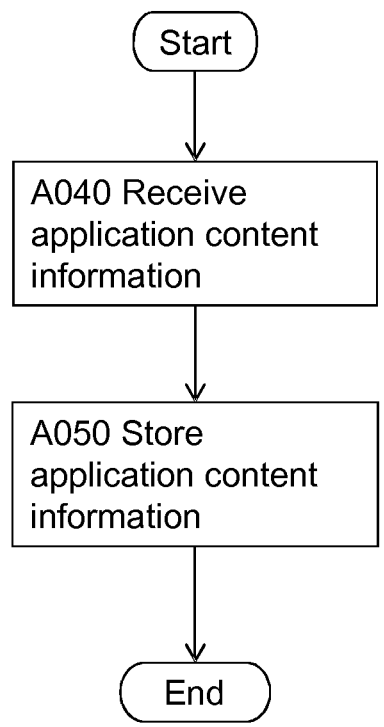
FIG. 13 is a flowchart illustrating embodiments of the method in the storage node.

In FIG. 13, a schematic flowchart of exemplifying methods in the storage node 180 is shown. Again, the same reference numerals as above have been used to denote the same or similar features, in particular the same reference numerals have been used to denote the same or similar actions. Accordingly, the storage node 180 performs a method for enabling filtering of traffic from an application 190 hosted by an application node 170 towards a user equipment 110.

One or more of the following actions may be performed in any suitable order.

Action A040

The storage node 180 receives, from a policy node 150, application content information relating to the filtering of the traffic and an identifier of the application 190 to which the application content information applies. The application content information comprises an indication relating to application content category and at least one of: an adaptability indicator specifying whether the application 190 is able to adapt the traffic to a given user content category, and a notification indicator specifying whether the application 190 is able to notify, to the policy node 150, an application content category before providing requested traffic.

Action A050

The storage node 180 stores the application content information.

Figure 14:
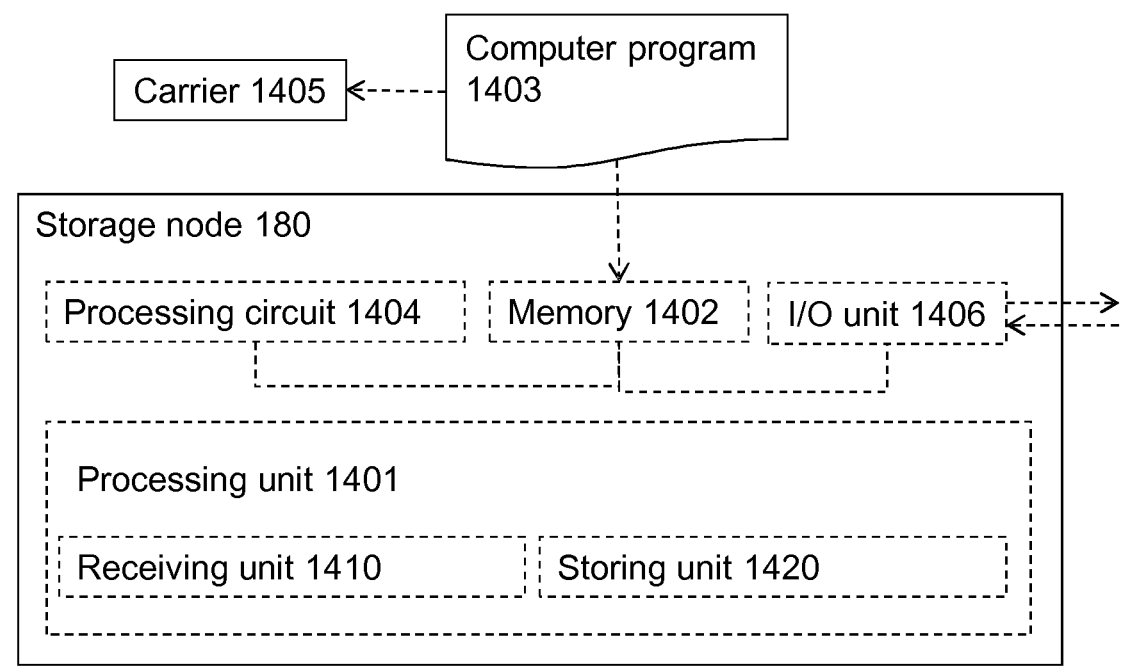
FIG. 14 is a block diagram illustrating embodiments of the storage node.

With reference to FIG. 14, a schematic block diagram of embodiments of the storage node 180 of FIG. 1 is shown.

The storage node 180 may comprise a processing unit 1401, such as a means for performing the methods described herein. The means may be embodied in the form of one or more hardware units and/or one or more software units. The term "unit" may thus refer to a circuit, a software block or the like according to various embodiments as described below.

The storage node 180 may further comprise a memory 1402. The memory may comprise, such as contain or store, instructions, e.g. in the form of a computer program 1403, which may comprise computer readable code units.

According to some embodiments herein, the storage node 180 and/or the processing unit 1401 comprises a processing circuit 1404 as an exemplifying hardware unit. Accordingly, the processing unit 1401 may be embodied in the form of, or 'realized by', the processing circuit 1404. The instructions may be executable by the processing circuit 1404, whereby the storage node 180 is operative to perform the methods of FIGS. 2a and 2b and/or FIG. 13. As another example, the instructions, when executed by the storage node 180 and/or the processing circuit 1404, may cause the storage node 180 to perform the method according to FIGS. 2*a* and 2*b* and/or FIG. 13.

In view of the above, in one example, there is provided a storage node 180 for enabling filtering of traffic as disclosed herein. Again, the memory 1402 contains the instructions executable by said processing circuit 1404 whereby the storage node 180 is operative to perform the method of FIG. 13.

FIG. 14 further illustrates a carrier 1405, or program carrier, which provides, such as comprises, mediates, supplies and the like, the computer program 1403 as described directly above. The carrier 1405 may be one of an electronic signal, an optical signal, a radio signal and a computer readable medium.

In further embodiments, the storage node 180 and/or the processing unit 1401 may comprise one or more of a receiving unit 1410, and a storing unit 1420 as exemplifying hardware units. The term "unit" may refer to a circuit when the term "unit" refers to a hardware unit. In other examples, one or more of the aforementioned exemplifying hardware units may be implemented as one or more software units.

Moreover, the storage node 180 and/or the processing unit 1401 may comprise an Input/Output unit 1406, which may be exemplified by the receiving unit and/or a transmitting unit when applicable.

Accordingly, the storage node 180 is configured for enabling filtering of traffic from an application 190 hosted by an application node 170 towards a user equipment 110.

Therefore, according to the various embodiments described above, the storage node 180 and/or the processing unit 1401 and/or the receiving unit 1410 and/or the processing circuit 1404 is configured for receiving, from a policy node 150, application content information relating to the filtering of the traffic and an identifier of the application 190 to which the application content information applies. The application content information comprises an indication relating to application content category and at least one of: an adaptability indicator specifying whether the application 190 is able to adapt the traffic to a given user content category, and a notification indicator specifying whether the application 190 is able to notify, to the policy node 150, an application content category before providing requested traffic.

The storage node 180 and/or the processing unit 1401 and/or the storing unit 1410 and/or the processing circuit 1404 is configured for storing the application content information.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, an object according to Component Object Model (COM), a software function, a software engine, an executable binary software file or the like.

The terms "processing unit" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a policy node, for enabling filtering of traffic from an application hosted by an application node towards a user equipment, the method comprising:
   receiving, from the application node, application content information relating to the filtering of the traffic and an identifier of the application to which the application content information applies, the application content information comprising an indication relating to application content category of the traffic, and the application content information comprising one or more of:
      an adaptability indicator specifying whether the application is able to adapt the traffic to a given user content category; and
      a notification indicator specifying whether the application is able to notify, to the policy node, the application content category of the traffic before providing requested traffic;
   transmitting, to a storage node, the application content information; and
   during establishment of an application session between the user equipment and the application:
      retrieving, from the storage node, user filtering information, comprising an indication relating to a user content category for the application and for the user equipment;
      receiving, from a session node, a request for policy rules for the traffic to be transmitted by the application, in response to that the user equipment requests the traffic;
      retrieving, from the storage node, the application content information comprising the indication relating to application content category for the traffic identified by the identifier of the application;
      determining the policy rules indicating to the session node whether to instruct a user data node to block the traffic or to allow the traffic to pass based on the user filtering information and the application content information; and
      transmitting, to the session node, the policy rules.

2. The method according to claim 1, wherein the application content information comprises a time indicator specifying a time period during which application content category is valid.

3. The method according to claim 1, wherein the indication relating to application content category indicates a specific application content category.

4. The method according claim 1, wherein the user filtering information comprises a filtering policy for the user content category, wherein the filtering policy indicates one of deny access and allow access and at least one of adapt traffic and notify the policy node.

5. The method according to claim 4, wherein the policy rules indicate to the session node to instruct the user data node to block the traffic when the filtering policy indicates deny access and the indication relating to the user content category matches the indication relating to application content category.

6. The method according to claim 1, when the application content information comprises the notification indicator indicating that the application is able to notify, the indication relating to application content category indicates unspecified content category, wherein the determining of the policy rules comprises determining the policy rules to indicate to the session node to instruct the user data node to allow the traffic to pass, wherein the method further comprises:
   receiving, from the application, a notification indicating a notified application content category;
   determining a first request message indicating to the session node whether to instruct the user data node to block the traffic or to allow the traffic to pass based on the user filtering information and the notification; and
   transmitting the first request message to the session node.

7. The method according to claim 6, wherein the determining of the first request message comprises determining the first request message to indicate to the session node to instruct the user data node to allow the traffic to pass when the filtering policy indicates allow access and the indication relating to the user content category matches the notified application content category.

8. The method according to claim 6, wherein the determining of the first request message comprises determining the first request message to indicate to the session node to instruct the user data node to block the traffic when the filtering policy indicates deny access and the indication relating to the user content category matches the notified application content category.

9. The method according to claim 1, when the application content information comprises the notification indicator indicating that the application is able to notify, wherein the method further comprises:

transmitting, to the application, an instruction indicating to the application to transmit the notification before transmitting the traffic requested by the user equipment.

10. The method according to claim 1, when the application content information comprises the adaptability indicator specifying that the application is able to adapt the requested traffic, and the indication relating to application content category indicates unspecified content category, wherein the determining of the policy rules comprises determining the policy rules to indicate to the session node to instruct the user data node to allow the traffic to pass, wherein the method further comprises:

transmitting, to the application, a command indicating to the application to adapt the requested traffic before transmitting the traffic requested by the user equipment, wherein the application is required to adapt the requested traffic according to the user filtering information;

determining a second request message indicating to the session node whether to instruct the user data node to one of block the traffic and allow the traffic to pass based on the user filtering information; and transmitting the second request message to the session node.

11. A method, performed by an application node hosting an application, for enabling filtering of traffic from the application towards a user equipment, the method comprising:

transmitting, towards a policy node, application content information relating to the filtering of the traffic and an identifier of the application to which the application content information applies, the application content information comprises an indication relating to application content category and one or more of:

an adaptability indicator specifying whether the application is able to adapt the traffic to a given user content category;

a notification indicator specifying whether the application is able to notify, to the policy node, the application content category before providing requested traffic; and during establishment of an application session between the user equipment and the application:

retrieving, from a storage node, user filtering information, comprising an indication relating to a user content category for the application and for the user equipment;

receiving, from a session node, a request for policy rules for the traffic to be transmitted by the application, in response to that the user equipment requests the traffic;

retrieving, from the storage node, the application content information comprising the indication relating to application content category for the traffic identified by the identifier of the application;

determining the policy rules indicating to the session node whether to instruct a user data node to block the traffic or to allow the traffic to pass based on the user filtering information and the application content information; and transmitting, to the session node, the policy rules.

12. A policy node configured for enabling filtering of traffic from an application hosted by an application node towards a user equipment, the policy node being configured to:

receive, from the application node, application content information relating to the filtering of the traffic and an identifier of the application to which the application content information applies, the application content information comprising an indication relating to application content category of the traffic, and the application content information comprising one or more of:

an adaptability indicator specifying whether the application is able to adapt the traffic to a given user content category; and a notification indicator specifying whether the application is able to notify, to the policy node, the application content category of the traffic before providing requested traffic;

transmit, to a storage node, the application content information; and the policy node is configured to, during establishment of an application session between the user equipment and the application:

retrieve, from the storage node, user filtering information, comprising an indication relating to a user content category for the application and for the user equipment;

receive, from a session node, a request for policy rules for the traffic to be transmitted by the application, in response to that the user equipment requests the traffic;

retrieve, from the storage node, the application content information comprising the indication relating to application content category for the traffic identified by the identifier of the application;

determine the policy rules indicating to the session node whether to instruct a user data node to one of block the traffic and to allow the traffic to pass based on the user filtering information and the application content information; and transmit, to the session node, the policy rules.

13. The policy node according to claim 12, wherein the application content information comprises a time indicator specifying a time period during which application content category is valid.

14. The policy node according to claim 13, wherein the application content information comprises the time indicator specifying the time period during which the indication relating to application content category is valid, wherein the policy node is configured to at least one of determine the first request message and determine the second request message further based on the time indicator and a current time.

15. The policy node according to claim 12, when the application content information comprises the notification indicator indicating that the application is able to notify, and the indication relating to application content category indicates unspecified content category, wherein the policy node is configured to determine the policy rules by determining the policy rules to indicate to the session node to instruct the user data node to allow the traffic to pass, wherein the policy node is further configured to:

receive, from the application, a notification indicating a notified application content category;

determine a first request message indicating to the session node whether to instruct the user data node to block the traffic or to allow the traffic to pass based on the user filtering information and the notification; and transmit the first request message to the session node.

16. The policy node according to claim 12, when the application content information comprises the notification indicator indicating that the application is able to notify, the policy node is configured to:
   transmit, to the application, an instruction indicating to the application to transmit the notification before transmitting the traffic requested by the user equipment.

17. The policy node according to claim 12, when the application content information comprises the adaptability indicator specifying that the application is able to adapt the requested traffic, and the indication relating to application content category indicates unspecified content category, wherein the policy node is configured for determining the policy rules by determining the policy rules to indicate to the session node to instruct the user data node to allow the traffic to pass, wherein the policy node is further configured to:
   transmit, to the application, a command indicating to the application to adapt the requested traffic before transmitting the traffic requested by the user equipment, wherein the application is required to adapt the requested traffic according to the user filtering information;
   determine a second request message indicating to the session node whether to instruct the user data node to block the traffic or to allow the traffic to pass based on the user filtering information; and
   transmit the second request message to the session node.

18. An application node configured for hosting an application and configured for enabling filtering of traffic from the application towards a user equipment, the application node being configured to:
   transmit, towards a policy node, application content information relating to the filtering of the traffic and an identifier of the application to which the application content information applies, the application content information comprising an indication relating to application content category and one or more of:
an adaptability indicator specifying whether the application is able to adapt the traffic to a given user content category;
a notification indicator specifying whether the application is able to notify, to the policy node, the application content category before providing requested traffic; and
the policy node is configured to, during establishment of an application session between the user equipment and the application:
   retrieve, from the storage node, user filtering information, comprising an indication relating to a user content category for the application and for the user equipment;
   receive, from a session node, a request for policy rules for the traffic to be transmitted by the application, in response to that the user equipment requests the traffic;
   retrieve, from the storage node, the application content information comprising the indication relating to application content category for the traffic identified by the identifier of the application;
   determine the policy rules indicating to the session node whether to instruct a user data node to one of block the traffic and to allow the traffic to pass based on the user filtering information and the application content information; and
   transmit, to the session node, the policy rules.

* * * * *